US012621379B2

(12) United States Patent
Wang et al.

(10) Patent No.: US 12,621,379 B2
(45) Date of Patent: May 5, 2026

(54) ELECTRONIC DEVICE

(71) Applicant: HUAWEI TECHNOLOGIES CO., LTD., Shenzhen (CN)

(72) Inventors: Hanyang Wang, Reading (GB); Kexin Liu, Shanghai (CN); Dong Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 596 days.

(21) Appl. No.: 18/008,385

(22) PCT Filed: May 19, 2021

(86) PCT No.: PCT/CN2021/094633
§ 371 (c)(1),
(2) Date: Dec. 5, 2022

(87) PCT Pub. No.: WO2021/244293
PCT Pub. Date: Dec. 9, 2021

(65) Prior Publication Data
US 2023/0283698 A1 Sep. 7, 2023

(30) Foreign Application Priority Data
Jun. 5, 2020 (CN) ........................ 202010504820.X

(51) Int. Cl.
*H04M 1/02* (2006.01)
*H01Q 1/22* (2006.01)
(Continued)

(52) U.S. Cl.
CPC .............. *H04M 1/026* (2013.01); *H01Q 1/22* (2013.01); *H01Q 13/10* (2013.01); *H01Q 19/17* (2013.01)

(58) Field of Classification Search
CPC ......... H04M 1/026; H01Q 1/22; H01Q 13/10; H01Q 19/17
(Continued)

(56) References Cited

U.S. PATENT DOCUMENTS

| | | | |
|---|---|---|---|
| 10,193,597 | B1 | 1/2019 | Garrido Lopez et al. |
| 2002/0126052 | A1 | 9/2002 | Boyle |

(Continued)

FOREIGN PATENT DOCUMENTS

| | | |
|---|---|---|
| CN | 101779329 A | 7/2010 |
| CN | 102263329 A | 11/2011 |

(Continued)

OTHER PUBLICATIONS

Gao et al., "High Frequency Electronic Circuit," 2019, 1 page (with English abstract).
(Continued)

*Primary Examiner* — Michael R Neff
(74) *Attorney, Agent, or Firm* — Fish & Richardson P.C.

(57) ABSTRACT

Electronic devices and antenna structures are described. An example electronic device includes an antenna structure, wherein the antenna structure includes: a first radiator and a second radiator, wherein the first radiator includes a first end and a second end, and the second radiator includes a first end and a second end. The first end of the first radiator and the first end of the second radiator face each other and are not in contact with each other, and a slot is formed between the first end of the first radiator and the first end of the second radiator. The first radiator and the second radiator are disposed in a bent manner, and a spatial region formed between the first radiator, the second radiator, and the slot is T-shaped; and the second end of the first radiator is grounded, and the second end of the second radiator is grounded.

20 Claims, 24 Drawing Sheets

(51) Int. Cl.
  *H01Q 13/10* (2006.01)
  *H01Q 19/17* (2006.01)

(58) Field of Classification Search
  USPC ........................................................ 455/575.7
  See application file for complete search history.

(56) References Cited

U.S. PATENT DOCUMENTS

| | | | |
|---|---|---|---|
| 2012/0050134 A1* | 3/2012 | Wu | H01Q 13/16 |
| | | | 343/908 |
| 2015/0002347 A1 | 1/2015 | Jeong | |
| 2017/0048649 A1* | 2/2017 | Olgun | H04B 5/43 |
| 2017/0162948 A1* | 6/2017 | Wong | H01Q 13/10 |

FOREIGN PATENT DOCUMENTS

| | | |
|---|---|---|
| CN | 104993240 A | 10/2015 |
| CN | 108767499 A | 11/2018 |
| CN | 109586036 A | 4/2019 |
| CN | 109687111 A | 4/2019 |
| CN | 110829002 A | 2/2020 |
| CN | 111193110 A | 5/2020 |
| EP | 3883061 A1 | 9/2021 |
| EP | 4099504 A1 | 12/2022 |
| WO | 2019071847 A1 | 4/2019 |
| WO | 2021093684 A1 | 5/2021 |
| WO | 2021213125 A1 | 10/2021 |

OTHER PUBLICATIONS

Chang et al., "Orthogonally Polarized Dual Antenna Pair With High Isolation and Balanced High Performance for 5G MIMO Smartphone," EEE Transactions on Antennas and Propagation, vol. 68, No. 5, May 2020, 9 pages.

Han et al., "Co-Location Arranged Handset Antenna Pairs For 5G Mimo Applications," Proceedings of the 8th Asia- Pacific Conference on Antennas and Propagation (APCAP 2019), Incheon, Korea, Aug. 4-7, 2019, 2 pages.

Xu et al., "A Highly Integrated MIMO Antenna Unit: Differential/Common Mode Design," IEEE Transactions on Antennas and Propagation, vol. 67, No. 11, Nov. 2019, 11 pages.

Extended European Search Report in European Appln No. 21818098. 2, dated Oct. 11, 2023, 11 pages.

International Search Report and Written Opinion in International Appln. No. PCT/CN2021/094633, mailed on Aug. 27, 2021, 15 pages (with English translation).

Communication pursuant to Article 94(3) EPC in European Appln. No. 21818098.2, mailed on Dec. 3, 2025, 6 pages.

* cited by examiner

70

71

PCB

72

(a)

70

71

72

←— Current        ◄┄┄┄ Electric field        ◄—— Magnetic current (b)

Side view (a)

Main view (b)

Oblique view (c)

Half-wavelength mode

Current distribution diagram when a first feed unit performs feeding (a)

Three half-wavelength mode

Current distribution diagram when a first feed unit performs feeding (b)

Half-wavelength mode

Current distribution diagram when a second feed unit performs feeding (a)

Three half-wavelength mode

Current distribution diagram when a second feed unit performs feeding (b)

One-fold wavelength mode
Current distribution diagram when a filter is conducted (a)

Two-fold wavelength mode
Current distribution diagram when a filter is conducted (b)

Largest
current point

Largest electric
field point

One-fold wavelength mode (a)

Largest
current point

Largest electric
field point

Two-fold wavelength mode
Current distribution diagram when a fourth feed unit performs feeding (b)

○ Largest current point

◍ Largest electric field point

Half-wavelength mode
Current distribution diagram when a fifth feed unit performs feeding (a)

○ Largest current point

◍ Largest electric field point

Three half-wavelength mode
Current distribution diagram when a fifth feed unit performs feeding (b)

Largest
current point

Largest electric
field point

Half-wavelength mode
Current distribution diagram when a fourth feed unit performs feeding (a)

Largest current
point

Largest electric
field point

Three half-wavelength mode
Current distribution diagram when a fourth feed unit performs feeding (b)

○ Largest current point

▨ Largest electric field point

Half-wavelength mode
Current distribution diagram when a fifth feed unit performs feeding (a)

○ Largest current point

▨ Largest electric field point

Three half-wavelength mode
Current distribution diagram when a fifth feed unit performs feeding (b)

ELECTRONIC DEVICE

CROSS-REFERENCE TO RELATED APPLICATIONS

This application is a National Stage of International Patent Application No. PCT/CN2021/094633, filed on May 19, 2021, which claims priority to Chinese Patent Application No. 202010504820.X, filed on Jun. 5, 2020, both of which are hereby incorporated by reference in their entireties.

TECHNICAL FIELD

This application relates to the field of wireless communications, and in particular, to an electronic device.

BACKGROUND

With rapid development of wireless communications technologies, in the past, the second generation (second generation, 2G) mobile communications system mainly supports a call function. An electronic device is merely a tool used by people to send and receive short messages and perform voice communication. Because data is transmitted via a voice channel, a wireless Internet access speed is extremely slow. Nowadays, in addition to making calls, sending short messages, and taking photos, the electronic device can be used to listen to music online, watch online movies, perform real-time video calling, and the like, which cover various applications such as calls, movies, entertainment, and E-commerce in people's life. For a plurality of functional applications, data needs to be uploaded and downloaded over a wireless network. Therefore, high-speed data transmission becomes extremely important.

As people have an increasing demand for high-speed data transmission, a requirement for an antenna becomes higher. However, a volume reserved for the antenna in the electronic device is limited. Therefore, the antenna is designed to cover a maximum frequency range with a minimum volume. This requires comprehensive use of a plurality of operating modes of the antenna. In addition, as a quantity of antennas continuously increases, implementing relatively good isolation between the antennas also becomes an urgent problem to be resolved.

SUMMARY

Embodiments of this application provide an electronic device. The electronic device may include an antenna structure. When the antenna structure is symmetrical, a common mode and a differential mode may be respectively excited through symmetrical feed and anti-symmetrical feed. Because radiation generated by the two modes is integrally orthogonal in far field, the antenna structure may be used as a co-radiator dual-antenna structure. When the antenna structure uses the asymmetrical feed or the antenna structure is asymmetrical, a single feed unit may simultaneously excite the common mode and the differential mode. A plurality of operating modes of an antenna are used to extend an operating bandwidth of the antenna, so that the antenna covers more frequency ranges with a limited volume. The antenna structure may be used as a broadband antenna.

According to a first aspect, an electronic device is provided, including an antenna structure. The antenna structure includes: a first radiator, where the first radiator includes a first end and a second end; and a second radiator, where the second radiator includes a first end and a second end. The first end of the first radiator and the first end of the second radiator face each other and are not in contact with each other, and a slot is formed between the first end of the first radiator and the first end of the second radiator. The first radiator and the second radiator are disposed in a bent manner, and a spatial region formed between the first radiator, the second radiator, and the slot is T-shaped. The second end of the first radiator is grounded, and the second end of the second radiator is grounded.

According to the technical solution in this embodiment of this application, a slitted loop antenna structure formed by the first radiator and the second radiator may generate a plurality of operating modes to extend an operating bandwidth, so that an antenna covers a larger frequency range with a limited volume in the electronic device.

With reference to the first aspect, in some implementations of the first aspect, the first radiator is located on one side of an axis of the slot, and the second radiator is located on the other side of the axis.

According to the technical solution in this embodiment of this application, the first radiator and the second radiator may be located on both sides of the axis of the slot. It should be understood that a more symmetrical structure can enable the antenna to obtain better isolation as a whole.

With reference to the first aspect, in some implementations of the first aspect, the first radiator and the second radiator are symmetrical to each other with respect to the axis.

According to the technical solution in this embodiment of this application, when the first radiator and the second radiator are symmetrical to each other with respect to the axis, both a common mode and a differential mode of the antenna structure may be excited. The antenna structure provided in this embodiment of this application may be used as a co-radiator dual-antenna structure. When the first radiator and the second radiator are asymmetrical to each other in a first direction, all common modes and differential modes of the antenna structure may be simultaneously excited by using a single feed unit, so that more modes of the antenna structure are covered to obtain a wider operating bandwidth. However, in this case, the antenna structure provided in this embodiment of this application can include only one feed unit, and can be used as a broadband single antenna.

With reference to the first aspect, in some implementations of the first aspect, the electronic device further includes a first feed unit. The first feed unit feeds the antenna structure at the first end of the first radiator and the first end of the second radiator.

According to the technical solution in this embodiment of this application, the first feed unit may feed the antenna structure in a symmetrical feed manner, to excite a common mode of the antenna structure.

With reference to the first aspect, in some implementations of the first aspect, the electronic device further includes a metal part. The first feed unit feeds the antenna structure in an indirect coupling manner at the first end of the first radiator and the first end of the second radiator by using the metal part.

According to the technical solution in this embodiment of this application, the metal part may be a metal spring. The first feed unit may feed the antenna structure in an indirect coupling manner by using the metal spring. In addition, to implement an indirect coupling feeding structure, the metal part may alternatively be a metal patch disposed on a printed circuit board of the electronic device. After the metal patch is disposed on the printed circuit board, a distance between the metal patch and the slot becomes larger. Therefore, a coupling area may be correspondingly increased to achieve a same effect. The bandwidth of the antenna structure may be extended by feeding in an indirect coupling manner.

With reference to the first aspect, in some implementations of the first aspect, when the first feed unit is feeding, a current on the first radiator and a current on the second radiator are symmetrical to each other with respect to the axis.

According to the technical solution in this embodiment of this application, the first feed unit feeds the antenna structure in the symmetrical feed manner. When the first feed unit is feeding, there are 2N−1 reverse current points on the first radiator or the second radiator. In this case, resonance generated by the antenna structure may be defined as a common mode at an N−½ wavelength. N is a positive integer.

With reference to the first aspect, in some implementations of the first aspect, the electronic device further includes a second feed unit. A positive electrode of the second feed unit is electrically connected to the second end of the first radiator, and a negative electrode of the second feed unit is electrically connected to the second end of the second radiator.

According to the technical solution in this embodiment of this application, the second feed unit may feed the antenna structure in an anti-symmetrical feed manner, to excite the differential mode of the antenna structure.

With reference to the first aspect, in some implementations of the first aspect, when the second feed unit is feeding, a current on the first radiator and a current on the second radiator are anti-symmetrical to each other with respect to the axis.

According to the technical solution in this embodiment of this application, the second feed unit feeds the antenna structure in the anti-symmetrical feed manner. When the second feed unit is feeding, there are 2N−2 reverse current points on the first radiator or the second radiator. In this case, resonance generated by the antenna structure may be defined as a differential mode at an N−½-wavelength. N is a positive integer.

With reference to the first aspect, in some implementations of the first aspect, the electronic device further includes a filter. One end of the filter is electrically connected to the first end of the first radiator, and the other end is electrically connected to the first end of the second radiator. When the second feed unit is feeding, the filter has a band-pass characteristic in a frequency band corresponding to resonance generated when the antenna structure operates in an N-wavelength mode, and the filter has a band-stop characteristic in a frequency band corresponding to resonance generated when the antenna structure operates in an N−½-wavelength mode.

According to the technical solution in this embodiment of this application, the filter may have the band-pass characteristic in the frequency band corresponding to the resonance generated when the antenna structure operates in the N-wavelength mode, that is, the filter is conducted, so that the first radiator is electrically connected to the second radiator. In this case, the antenna structure is a loop antenna without a slot (the antenna structure is closed), and may operate in the N-wavelength mode. The filter may have the band-stop characteristic in the frequency band corresponding to the resonance generated when the antenna structure operates in the N−½-wavelength mode, that is, the filter is not conducted, so that the first radiator and the second radiator are open-circuited. In this case, the antenna structure is a loop antenna with a slot, and may operate in the N−½-wavelength mode. Therefore, when the second feed unit is feeding, both the N-wavelength mode and the N−½-wavelength mode may be excited, to extend the operating bandwidth of the antenna structure.

With reference to the first aspect, in some implementations of the first aspect, the electronic device further includes a third feed unit. The third feed unit feeds the antenna structure on the first radiator. Alternatively, the third feed unit feeds the antenna structure on the second radiator.

According to the technical solution in this embodiment of this application, when asymmetrical feed is performed on the antenna structure, all common modes and differential modes of the antenna structure may be simultaneously excited by using a single feed unit, so that more modes of the antenna structure are covered to obtain a wider operating bandwidth. However, in this case, the antenna structure provided in this embodiment of this application can include only one feed unit, and can be used as a broadband single antenna.

With reference to the first aspect, in some implementations of the first aspect, the electronic device further includes an antenna support. The antenna structure is disposed on a surface of the antenna support.

According to the technical solution in this embodiment of this application, the antenna structure may be disposed on a bezel or a rear cover of the electronic device, or may be implemented by using a laser-direct-structuring, flexible printed circuit printing, a floating metal, or the like on the antenna support.

With reference to the first aspect, in some implementations of the first aspect, the electronic device further includes an antenna support. The first radiator includes a first part and a second part. The second radiator includes a third part and a fourth part. The first part and the third part are parts of a metal bezel of the electronic device. The second part and the fourth part are disposed on a surface of the antenna support. The first part is directly electrically connected to the second part, and the third part is directly electrically connected to the fourth part.

According to the technical solution in this embodiment of this application, the antenna structure may be formed by combining a metal bezel antenna and a support antenna, to better use space in the electronic device.

With reference to the first aspect, in some implementations of the first aspect, the electronic device further includes a matching network. The matching network includes a first inductor, a second inductor, and a capacitor. One end of the first inductor is electrically connected to the second end of the first radiator, and the other end of the first inductor is electrically connected to the positive electrode of the second feed unit. One end of the second inductor is electrically connected to the second end of the second radiator, and the other end of the second inductor is electrically connected to the negative electrode of the second feed unit. The capacitor is connected in parallel between the first inductor and the second inductor.

According to the technical solution in this embodiment of this application, the matching network may be disposed at a feeding position of each feed unit, and a position of a resonance point at which the antenna structure generates resonance may be adjusted.

With reference to the first aspect, in some implementations of the first aspect, an inductance value of the first inductor is from 0.3 nH to 2 nH; an inductance value of the second inductor is from 0.3 nH to 2 nH; and a capacitance value of the capacitor is from 0.3 pF to 2 pF.

According to the technical solution in this embodiment of this application, a value of a capacitor, an inductor, or a resistor in the matching network may be adjusted, to adjust the position of the resonance point at which the antenna structure generates resonance.

With reference to the first aspect, in some implementations of the first aspect, the inductance value of the first inductor is 0.7 nH, the inductance value of the second inductor is 0.7 nH, and the capacitance value of the capacitor is 0.6 pF.

According to a second aspect, an electronic device is provided, including an antenna structure. The antenna structure includes a metal part, and an annular slot is disposed on the metal part. The annular slot divides the metal part into a first area and a second area, and the first area is a T-shaped area.

With reference to the second aspect, in some implementations of the second aspect, the electronic device further includes a connecting piece. The connecting piece is configured to connect a first area and a second area, so that the first area is electrically connected to the second area. The connecting piece divides the annular slot into a first slot and a second slot.

With reference to the second aspect, in some implementations of the second aspect, a connecting piece is disposed on an axis of the first area, and a first slot and a second slot are located on both sides of the axis.

With reference to the second aspect, in some implementations of the second aspect, the first area and the second area are symmetrical to each other with respect to an axis.

With reference to the second aspect, in some implementations of the second aspect, the electronic device further includes a fourth feed unit. A first feed point is disposed in the first area, and the first feed point is located on an axis. The fourth feed unit feeds the antenna structure at the first feed point.

With reference to the second aspect, in some implementations of the second aspect, when a fourth feed unit is feeding, electric fields of the annular slot are symmetrical with respect to an axis.

With reference to the second aspect, in some implementations of the second aspect, the electronic device further includes a fifth feed unit. A second feed point and a third feed point are disposed in the second area, and the second feed point and the third feed point are symmetrical to each other with respect to an axis. A positive electrode of the fifth feed unit is electrically connected to the metal part at the second feed point, and a negative electrode of the fifth feed unit is electrically connected to the metal part at the third feed point.

With reference to the second aspect, in some implementations of the second aspect, when a fifth feed unit is feeding, electric fields of the annular slot are anti-symmetrical with respect to an axis.

With reference to the second aspect, in some implementations of the second aspect, the electronic device further includes a sixth feed unit. A fourth feed point is disposed on the metal part. The sixth feed unit feeds the antenna structure at the fourth feed point.

With reference to the second aspect, in some implementations of the second aspect, the electronic device further includes an antenna support. The antenna structure is disposed on a surface of the antenna support.

According to a third aspect, an electronic device is provided, including at least one antenna structure according to the first aspect and at least one antenna structure according to the second aspect.

DESCRIPTION OF EMBODIMENTS

The following describes the technical solutions of this application with reference to the accompanying drawings.

The technical solutions provided in this application are applicable to an electronic device that uses one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution, LTE) communications technology, a 5G communications technology, a SUB-6G communications technology, and other future communications technologies. An electronic device in this embodiment of this application may be a mobile phone, a tablet computer, a notebook computer, a smart band, a smartwatch, a smart helmet, smart glasses, or the like. Alternatively, the electronic device may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a terminal device in a 5G network, a terminal device in a future evolved public land mobile network (public land mobile network, PLMN), or the like. This is not limited in this embodiment of this application.

Figure 1:
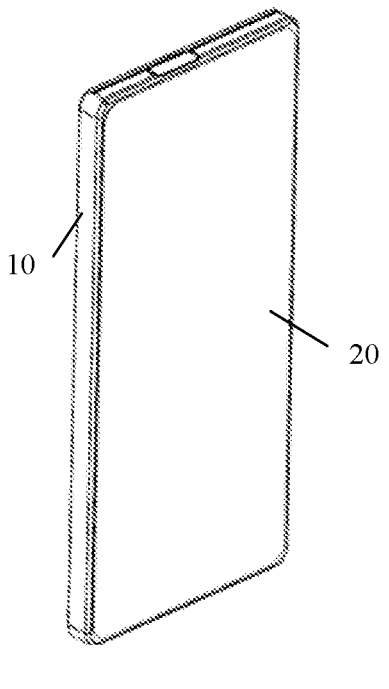
FIG. 1 is a schematic diagram of an electronic device according to an embodiment of this application.

FIG. 1 is a schematic diagram of an electronic device according to an embodiment of this application. Herein, an example in which the electronic device is a mobile phone is used for description.

As shown in FIG. 1, the electronic device has a shape similar to a cube, and may include a bezel 10 and a display 20. Both the bezel 10 and the display 20 may be mounted on a middle bezel (not shown in the figure). The bezel 10 may be divided into an upper bezel, a lower bezel, a left bezel, and a right bezel. These bezels are connected to each other, and may form a specific radian or chamfer at a joint.

The electronic device further includes a printed circuit board (printed circuit board, PCB) disposed inside. An electronic element may be disposed on the PCB. The electronic element may include a capacitor, an inductor, a resistor, a processor, a camera, a flash, a microphone, a battery, or the like, but is not limited thereto.

The bezel 10 may be a metal bezel made of metal such as copper, a magnesium alloy, or stainless steel, or may be a plastic bezel, a glass bezel, a ceramic bezel, or the like, or may be a bezel combining metal and plastic.

In recent years, mobile communications have become increasingly important in people's life. In particular, with the advent of an era of a fifth generation (fifth generation, 5G) mobile communications system, a requirement for an antenna is increasingly high. A volume reserved for an antenna in the electronic device is limited. Therefore, how to minimize a designed volume of the antenna to achieve a maximum coverage frequency range is a problem that needs to be resolved urgently.

In a conventional loop antenna design, the lowest mode in an anti-symmetrical feed manner is a one-wavelength mode. In a limited size of the electronic device, only a relatively high frequency band, for example, 1700 MHz to 2700 MHz, can be covered, and a relatively low frequency band, for example, 700 MHz to 960 MHz, cannot be covered. In addition, fewer modes can be used in the conventional loop antenna structure, and more modes are needed to meet wide-bandwidth coverage.

Embodiments of this application provide an antenna structure design solution. A plurality of operating modes of an antenna are used to extend an operating bandwidth of the antenna, so that the antenna covers a larger frequency range with a limited volume. In addition, a co-radiator dual-antenna structure with good isolation may be further disposed by using the antenna structure.

Figure 2:
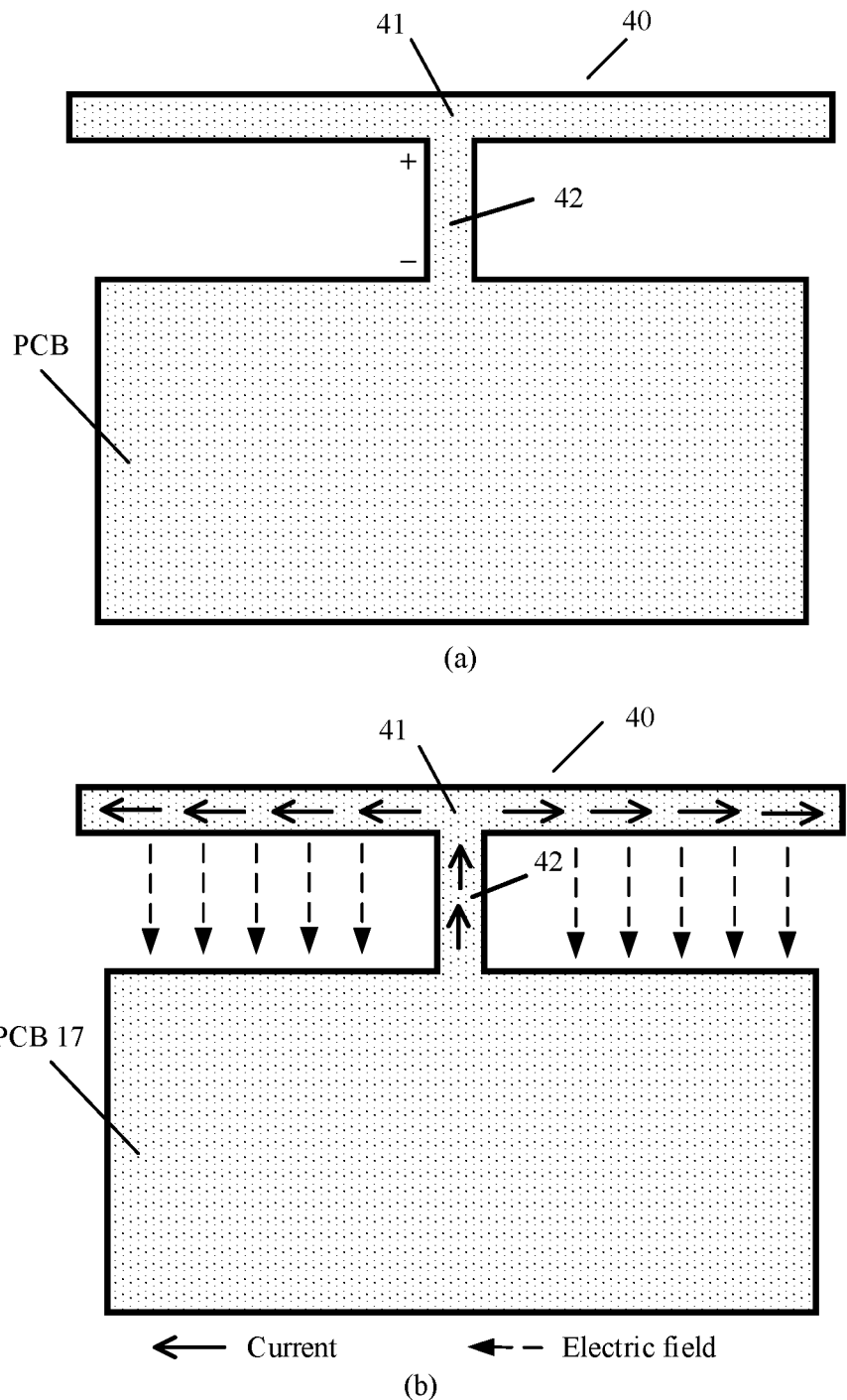
FIG. 2 is a diagram depicting a structure of a common mode wire antenna and distribution of corresponding currents and electric fields according to this application.
Figure 3:
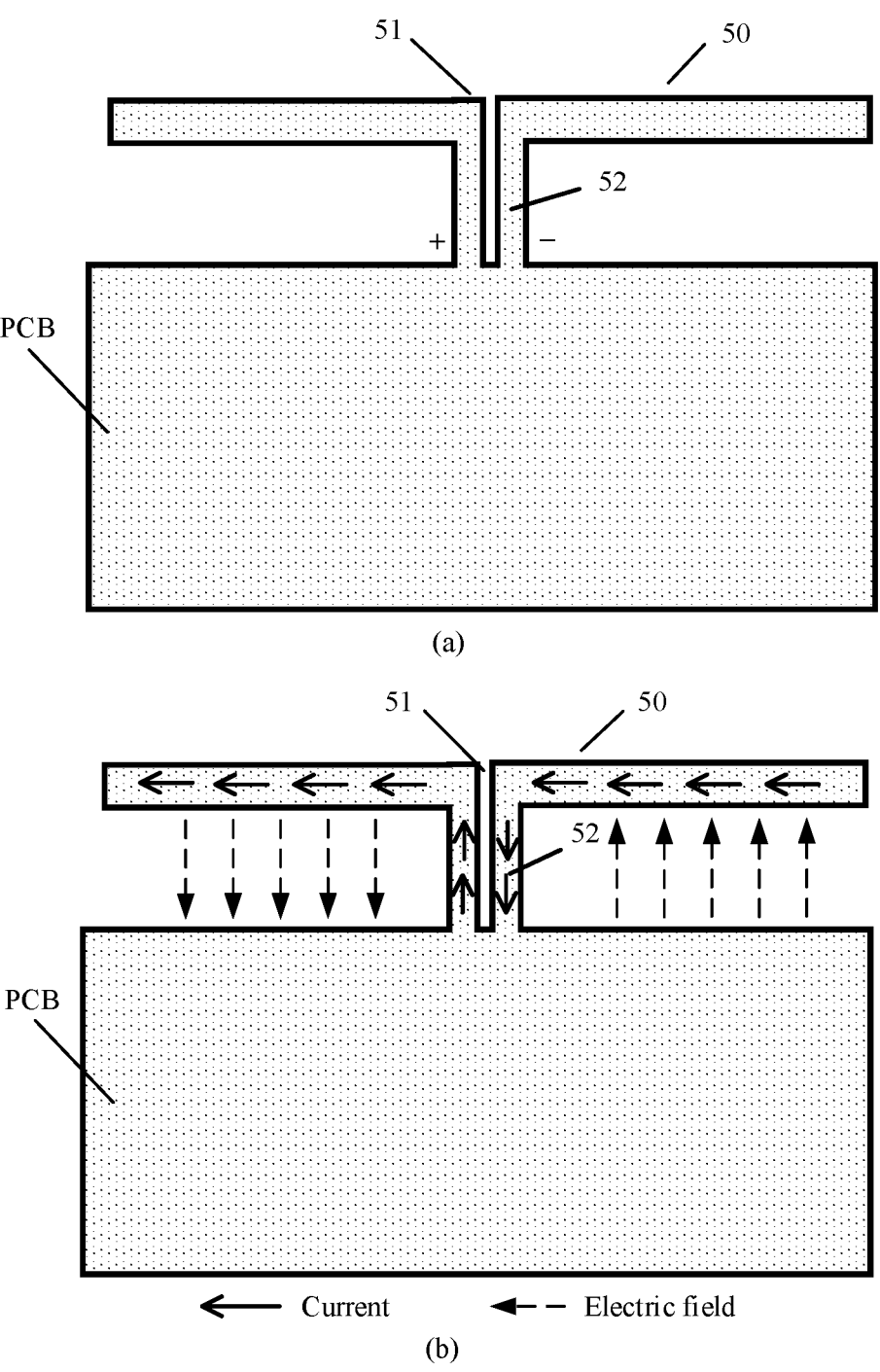
FIG. 3 is a diagram depicting a structure of a differential mode wire antenna and distribution of corresponding currents and electric fields according to this application.
Figure 4:
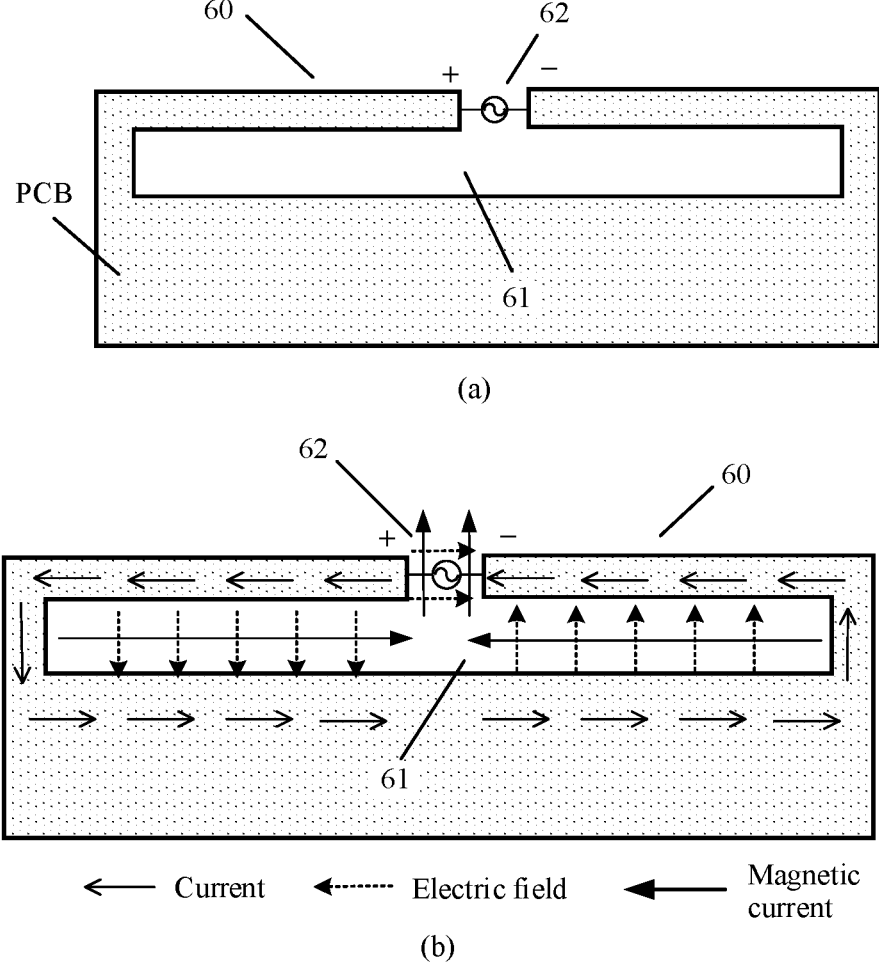
FIG. 4 is a diagram depicting a structure of a common mode slot antenna and distribution of corresponding currents, electric fields, and magnetic currents according to this application.
Figure 5:
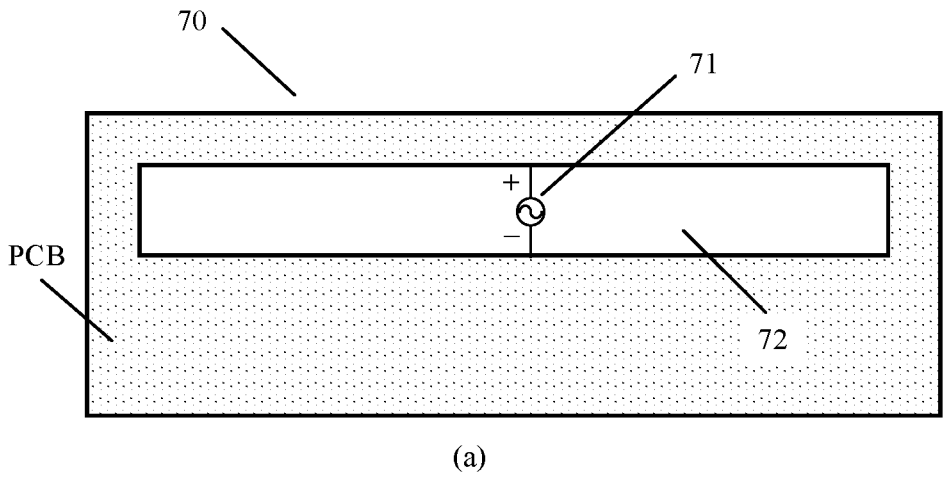
FIG. 5 is a diagram depicting a structure of a differential mode slot antenna and distribution of corresponding currents, electric fields, and magnetic currents according to this application.
Figure 5:
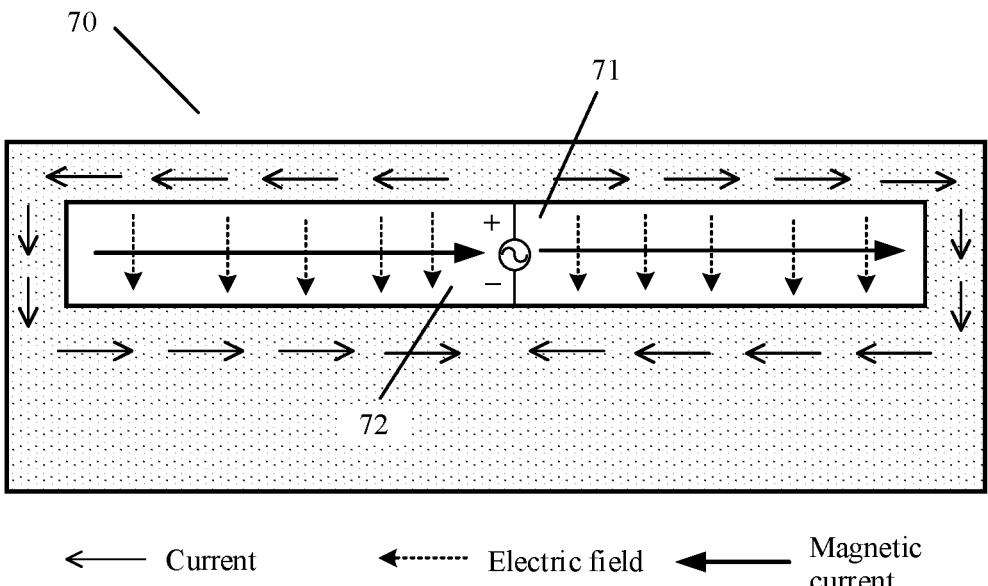

First, FIG. 2 to FIG. 5 describe four antenna modes in this application. FIG. 2 is a schematic diagram depicting a structure of a common mode wire antenna and distribution of corresponding currents and electric fields according to this application. FIG. 3 is a schematic diagram depicting a structure of another differential mode wire antenna and distribution of corresponding currents and electric fields according to this application. FIG. 4 is a schematic diagram depicting a structure of a common mode slot antenna and distribution of corresponding currents, electric fields, and magnetic currents according to this application. FIG. 5 is a schematic diagram depicting a structure of another differential mode slot antenna and distribution of corresponding currents, electric fields, and magnetic currents according to this application.

1. Common Mode (Common Mode, CM) Mode of a Wire Antenna

As shown in (a) in FIG. 2, a wire antenna 40 is connected to a feed unit at a middle position 41. A positive electrode of the feed unit is connected to the middle position 41 of the wire antenna 40 by using a feed line 42, and a negative electrode of the feed unit is connected to a ground (for example, a floor, which may be a PCB).

(b) in FIG. 2 shows distribution of currents and electric fields of the wire antenna 40. As shown in (b) in FIG. 2, currents on both sides of the middle position 41 are in opposite directions, and are symmetrically distributed. The electric fields are codirectionally distributed on both sides of the middle position 41. As shown in (b) in FIG. 2, currents are codirectionally distributed at the feed line 42. Based on codirectional distribution of the currents at the feed line 42, the feeding shown in (a) in FIG. 2 may be referred to as CM feeding for the wire antenna. A wire antenna mode shown in (b) in FIG. 2 may be referred to as the CM mode of the wire antenna. The current and the electric field shown in (b) in FIG. 2 may be respectively referred to as a CM mode current and a CM mode electric field of the wire antenna.

The CM mode current and the CM mode electric field of the wire antenna are generated by using two horizontal stubs on both sides of the middle position 41 of the wire antenna 40 as an antenna operating in a quarter-wavelength mode. The current is strong at the middle position 41 of the wire antenna 40 and weak at both ends of the wire antenna 101. The electric field is weak at the middle position 41 of the wire antenna 40 and strong at both ends of the wire antenna 40.

2. Differential Mode (Differential Mode, DM) Mode of a Wire Antenna

As shown in (a) in FIG. 3, a wire antenna 50 is connected to a feed unit at a middle position 51. A positive electrode of the feed unit is connected to one side of the middle position 51 by using a feed line 52, and a negative electrode of the feed unit is connected to the other side of the middle position 51 by using the feed line 52.

(b) in FIG. 3 shows distribution of currents and electric fields of the wire antenna 50. As shown in (b) in FIG. 3, currents are codirectional on both sides of the middle position 51, and are anti-symmetrically distributed. The electric fields are reversely distributed on both sides of the middle position 51. As shown in (b) in FIG. 3, currents are reversely distributed at the feed line 52. Based on reverse distribution of the currents at the feed line 52, the feeding shown in (a) of FIG. 3 may be referred to as DM feeding for the wire antenna. A wire antenna mode shown in (b) in FIG. 3 may be referred to as the DM mode of the wire antenna. The current and the electric field shown in (b) in FIG. 3 may be respectively referred to as a DM mode current and a DM mode electric field of the wire antenna.

The DM mode current and the DM mode electric field of the wire antenna are generated by using the entire wire antenna 50 as an antenna operating in a half-wavelength mode. The current is strong at the middle position 51 of the wire antenna 50 and weak at both ends of the wire antenna 50. The electric field is weak at the middle position 51 of the wire antenna 50 and strong at both ends of the wire antenna 50.

3. CM Mode of a Slot Antenna

As shown in (a) in FIG. 4, a slot antenna 60 may be formed by providing a slot on a floor. An opening 62 is disposed on one side of a slot 61, and the opening 62 may be specifically disposed in a middle position on the side. A feed unit may be connected to the opening 62. A positive electrode of the feed unit may be connected to one side of the opening 62, and a negative electrode of the feed unit may be connected to the other side of the opening 62.

(b) in FIG. 4 shows distribution of currents, electric fields, and magnetic currents of the slot antenna 60. As shown in (b) in FIG. 4, on a conductor (for example, a floor) around the slot 61, currents are codirectionally distributed around the slot 61. Electric fields are reversely distributed on both sides of a middle position of the slot 61. Magnetic currents are reversely distributed on both sides of the middle position of the slot 61. As shown in (b) in FIG. 4, electric fields are codirectional at the opening 62 (namely, a feeding position), and magnetic currents are codirectional at the opening 62 (namely, the feeding position). Based on codirectional magnetic currents at the opening 62 (the feeding position), the feeding shown in (a) of FIG. 4 may be referred to as CM feeding for the slot antenna. A slot antenna mode shown in (b) in FIG. 4 may be referred to as the CM mode of the slot antenna. The electric field, the current, and the magnetic current shown in (b) in FIG. 4 may be respectively referred to as a CM mode electric field, a CM mode current, and a CM mode magnetic current of the slot antenna.

The CM mode current and the CM mode electric field of the slot antenna are generated by using slot antenna bodies on both sides of the middle position of the slot antenna 60 as an antenna operating in a quarter-wavelength mode. The current is weak at the middle position of the slot antenna 60 and strong at both ends of the slot antenna 60. The electric field is strong at the middle position of the slot antenna 60 and weak at both ends of the slot antenna 60.

4. DM Mode of a Slot Antenna

As shown in (a) in FIG. 5, a slot antenna 70 may be formed by providing a slot on a floor. A feed unit is connected to a middle position 71 of the slot antenna 70. A middle position of one side edge of a slot 72 is connected to a positive electrode of the feed unit, and a middle position of the other side edge of the slot 72 is connected to a negative electrode of the feed unit.

(b) in FIG. 5 shows distribution of currents, electric fields, and magnetic currents of the slot antenna 70. As shown in (b) in FIG. 5, on a conductor (for example, a floor) around the slot 72, currents are distributed around the slot 72, and are reversely distributed on both sides of a middle position of the slot 72. Electric fields are reversely distributed on both sides of the middle position 71. Magnetic currents are codirectionally distributed on both sides of the middle position 71. Magnetic currents are reversely distributed at the feed unit (not shown). Based on reverse distribution of the magnetic currents at the feed unit, the feeding shown in (a) in FIG. 5 may be referred to as DM feeding for the slot antenna. A slot antenna mode shown in (b) in FIG. 5 may be referred to as the DM mode of the slot antenna. The electric field, the current, and the magnetic current shown in (b) in FIG. 5 may be respectively referred to as a DM mode electric field, a DM mode current, and a DM mode magnetic current of the slot antenna.

The DM mode current and the DM electric field of the slot antenna are generated by using the slot antenna 70 as an antenna operating in a half-wavelength mode. The current is weak at the middle position of the slot antenna 70 and strong at both ends of the slot antenna 70. The electric field is strong at the middle position of the slot antenna 70 and weak at both ends of the slot antenna 70.

Figure 6:
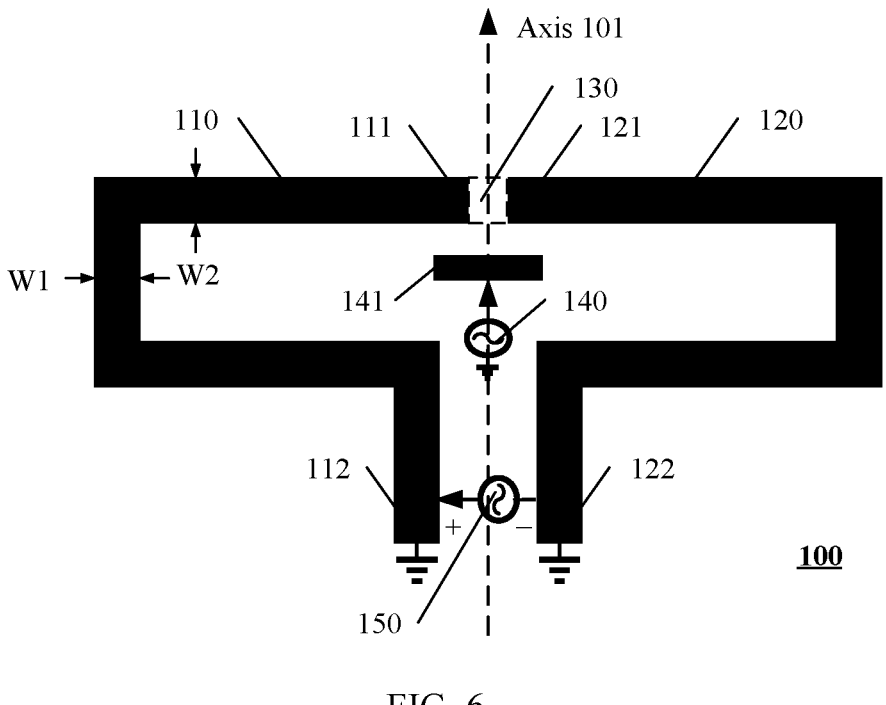
FIG. 6 is a schematic diagram of a structure of a wire loop antenna according to an embodiment of this application.

FIG. 6 is a schematic diagram of a structure of a wire loop antenna according to an embodiment of this application. The wire loop antenna may be used in the electronic device shown in FIG. 1.

As shown in FIG. 6, the electronic device may include a first radiator 110 and a second radiator 120.

A first end 111 of the first radiator 110 and a first end 121 of the second radiator 120 face each other and are not in contact with each other. A slot 130 is formed between the first end 111 of the first radiator 110 and the first end 121 of the second radiator 120. The first radiator 110 and the second radiator 120 are disposed in a bent manner. A spatial region formed between the first radiator 110, the second radiator 120, and the slot 130 is T-shaped. In other words, a spatial region formed between the first radiator 110 and the second radiator 120 is a cross (cross). A second end 112 of the first radiator 110 is disposed adjacent to a second end 122 of the second radiator 120. The second end 112 of the first radiator 110 is grounded, and the second end 122 of the second radiator 120 is grounded. The first radiator 110 and the second radiator 120 form a wire loop antenna 100.

It should be understood that a T-shaped spatial region may be formed between the first radiator 110 and the second radiator 120. The wire loop antenna 100 may be folded based on space inside the electronic device.

Figure 7:
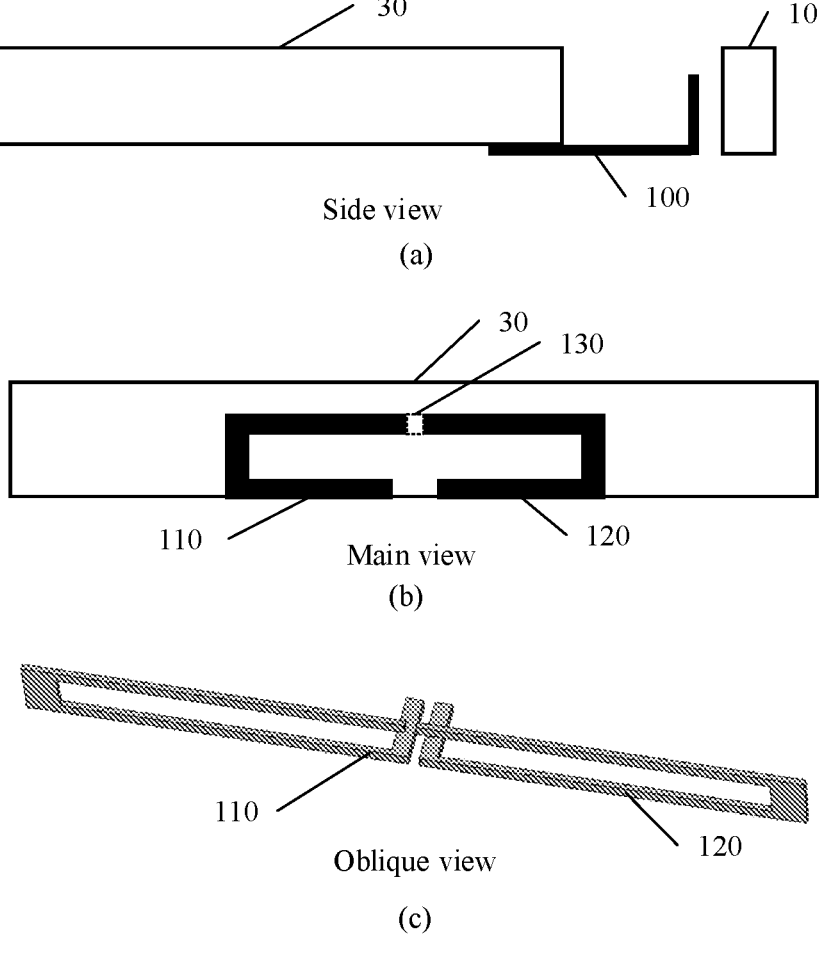
FIG. 7 shows different views of an antenna structure shown in FIG. 6.

As shown in FIG. 7, the space inside the electronic device becomes increasingly small. Therefore, the wire loop antenna 100 may be disposed in a folded manner. For example, when the wire loop antenna 100 is disposed on an antenna support, to save space inside the electronic device, the wire loop antenna 100 may be folded in a direction toward a PCB 30. Correspondingly, the T-shaped region formed between the first radiator 110, the second radiator 120, and the slot 130 is also folded. As shown in (a) in FIG. 7, the wire loop antenna 100 may be disposed at an edge of the PCB 30. A part of the radiators of the wire loop antenna 100 may extend out of the PCB 30 and be located between the PCB 30 and the bezel 10 of the electronic device. Because space between the PCB 30 and the bezel 10 is insufficient to dispose the wire loop antenna 100 along a plane, the radiators of the wire loop antenna 100 may be folded up or down (in a direction close to the PCB 30 or in a direction away from the PCB 30). In this case, the T-shaped spatial region in the wire loop antenna 100 is also folded, as shown in (b) in FIG. 7. (c) in FIG. 7 shows a structure obtained after the first radiator 110 and the second radiator 120 in the wire loop antenna are folded.

In addition, it should be understood that the first end 111 of the first radiator 110 may be a radiator segment from an end point of the first radiator 110, and cannot be narrowly understood as necessarily a point. The second end 112 of the first radiator 110, the first end 121 of the second radiator 120, and the second end 122 of the second radiator 120 may also be correspondingly understood as the foregoing concepts.

Optionally, the first radiator 110 may be located on one side of an axis 101 of the slot 130, and the second radiator 130 may be located on the other side of the axis 101.

Optionally, the first radiator 110 and the second radiator 120 are symmetrical to each other with respect to the axis 101.

Optionally, the electronic device further includes a first feed unit 140. The first feed unit 140 may feed the wire loop antenna 100 at the first end 111 of the first radiator 110 and the second end 121 of the second radiator 120. The first feed unit 140 feeds the wire loop antenna 100 in a symmetrical feed (symmetrical feed) manner.

It should be understood that symmetrical feed may be understood as that one end of a feed unit is connected to a radiator, and the other end is grounded. A connection point (a feed point) between the feed unit and the radiator is located in a center of the radiator.

Optionally, the first feed unit 140 may feed the wire loop antenna 100 in an indirect coupling manner at the first end 111 of the first radiator 110 and the second end 121 of the second radiator 120 by using a metal part 141. The metal part 141 may be a metal spring, and the first feed unit 140 may feed the wire loop antenna 100 in the indirect coupling manner by using the metal spring. In addition, to implement an indirect coupling feeding structure, the metal part 141 may alternatively be a metal patch disposed on a PCB of the electronic device. After the metal patch is disposed on the PCB, a distance between the metal patch and the slot becomes larger. Therefore, a coupling area may be correspondingly increased to achieve a same effect.

It should be understood that indirect coupling, namely, interspace coupling, is a concept relative to direct coupling, and means that a direct electrical connection is not used. Direct coupling means a direct electrical connection, and direct feeding at a feed point.

Figure 8:
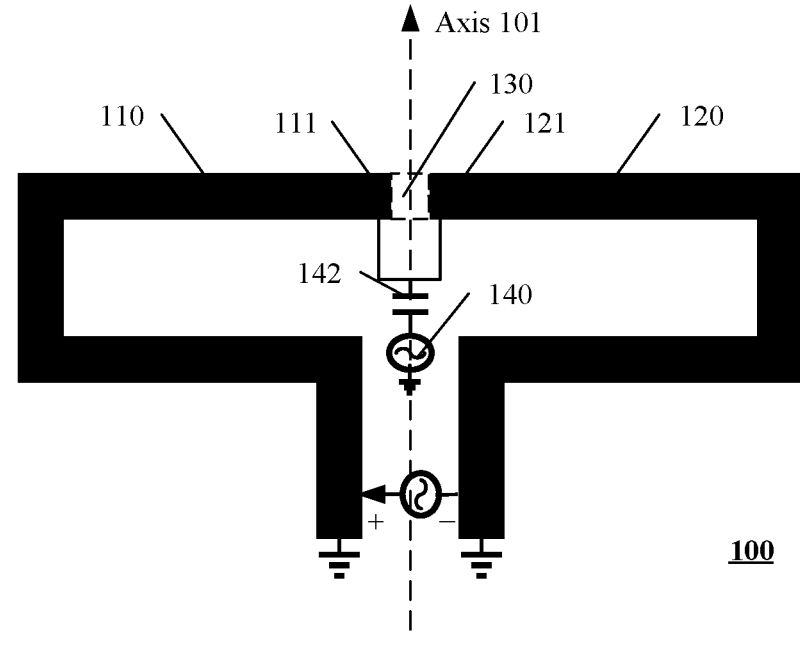
FIG. 8 is a schematic diagram of another feed unit connection manner according to an embodiment of this application.

Optionally, the first feed unit 140 may alternatively be electrically connected to the first end 111 of the first slot 110 and the second end 121 of the second slot 120 by using a capacitor 142, to directly feed the wire loop antenna 100, as shown in FIG. 8.

Optionally, the electronic device further includes a second feed unit 150. A positive electrode of the second feed unit 150 is electrically connected to the second end 112 of the first radiator 110, and a negative electrode of the second feed unit 150 is electrically connected to the second end 122 of the second radiator 120. The second feed unit 150 feeds the wire loop antenna 100 in an anti-symmetrical feed (anti-symmetrical feed) manner.

It should be understood that anti-symmetrical feed may be understood as that a positive electrode and a negative electrode of a feed unit are respectively connected to two ends of a radiator. Signals output by the positive electrode and the negative electrodes of the feed unit have a same amplitude but inverse phases.

Optionally, the wire loop antenna 100 may be disposed on a bezel or a rear cover of the electronic device, or may be implemented by using laser-direct-structuring (laser-direct-structuring, LDS), flexible printed circuit (flexible printed circuit, FPC) printing, floating metal (floating metal, FLM), or the like on the antenna support. For example, the electronic device may further include the antenna support, and the wire loop antenna 100 may be disposed on a surface of the antenna support. Alternatively, the first radiator 110 may include a first part and a second part. The second radiator may include a third part and a fourth part. The first part and the third part may be parts of a metal bezel of the electronic device. The second part and the fourth part may be disposed on the surface of the antenna support. The first part is directly electrically connected to the second part, to form the first radiator 110. The third part is directly electrically connected to the fourth part, to form the second radiator 120. A position at which the antenna provided in this application is disposed is not limited in this embodiment of this application.

Optionally, a width of each part of the first radiator 110 or the second radiator 120 may be different. The width of each part of the first radiator 110 or the second radiator 120 may be adjusted, to adjust a resonance point at which the wire loop antenna generates resonance. For example, a width W1 of the first radiator 110 in a horizontal direction may be different from a width W2 of the first radiator 110 in a vertical direction. The horizontal direction or the vertical direction may be perpendicular to an axis of the slot, or may be parallel to a direction of the bezel or the PCB of the electronic device. This is not limited in this application, and is merely used as an example.

Figure 9:
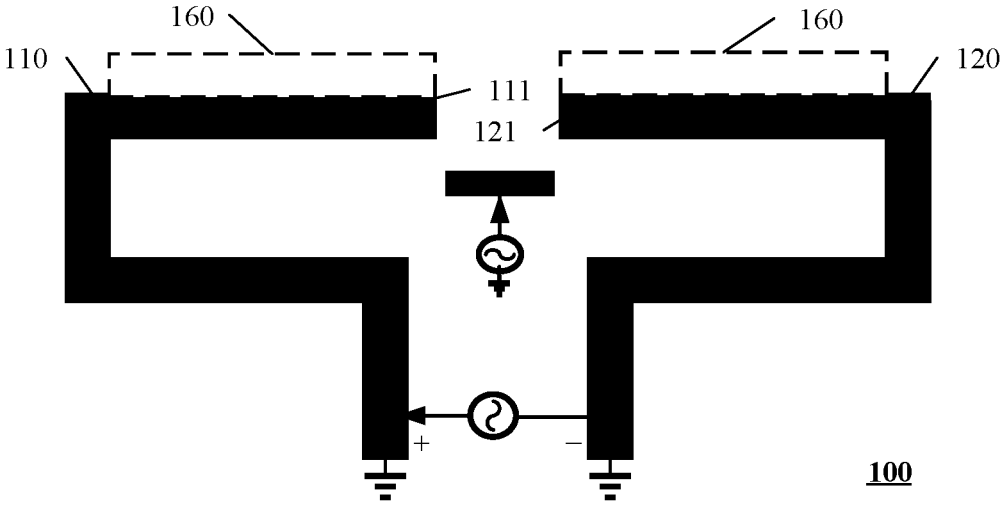
FIG. 9 is a schematic diagram of a structure of a parasitic stub according to an embodiment of this application.

Optionally, a width of the first radiator 110 or the second radiator 120 may be changed by using a parasitic patch 160, as shown in FIG. 9. For example, the parasitic patch 160 may be disposed at a position that is close to the first end 111 of the first radiator 110. A length or a width of the parasitic patch 160 may be adjusted, to change the resonance point at which the wire loop antenna generates resonance. In addition, a symmetrical parasitic patch 160 may also be added at a corresponding position that is symmetrical with respect to the axis of the slot and that is of the second radiator 120, so that a radiator structure of the wire loop antenna 100 is symmetrical with respect to the axis of the slot. It should be understood that a more symmetrical structure can enable the antenna to obtain better isolation as a whole.

Figure 10:
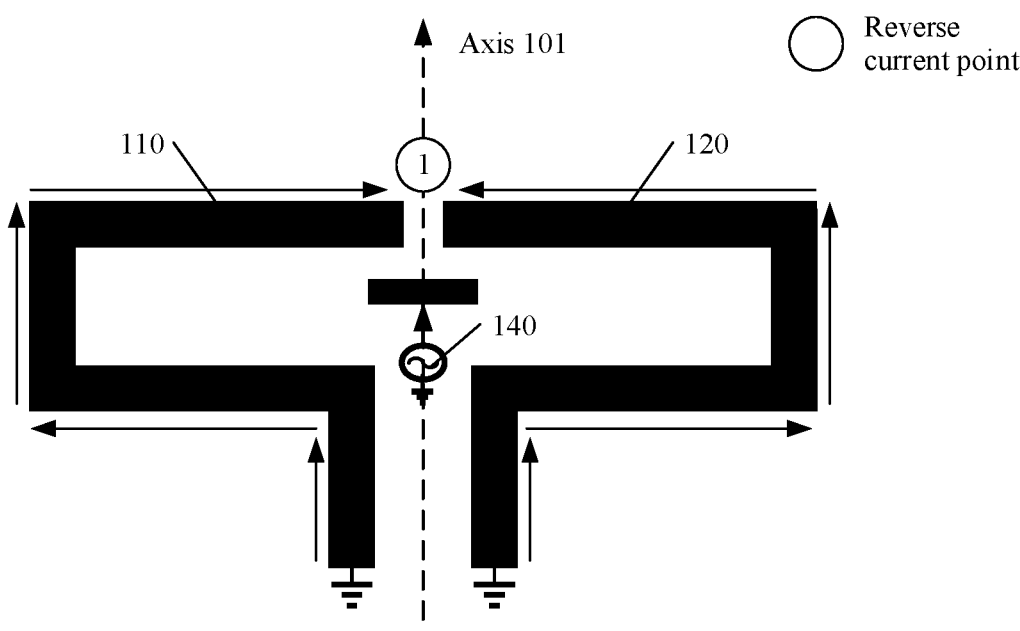
FIG. 10 is a current distribution diagram of a wire loop antenna when a first feed unit is feeding.
Figure 10:
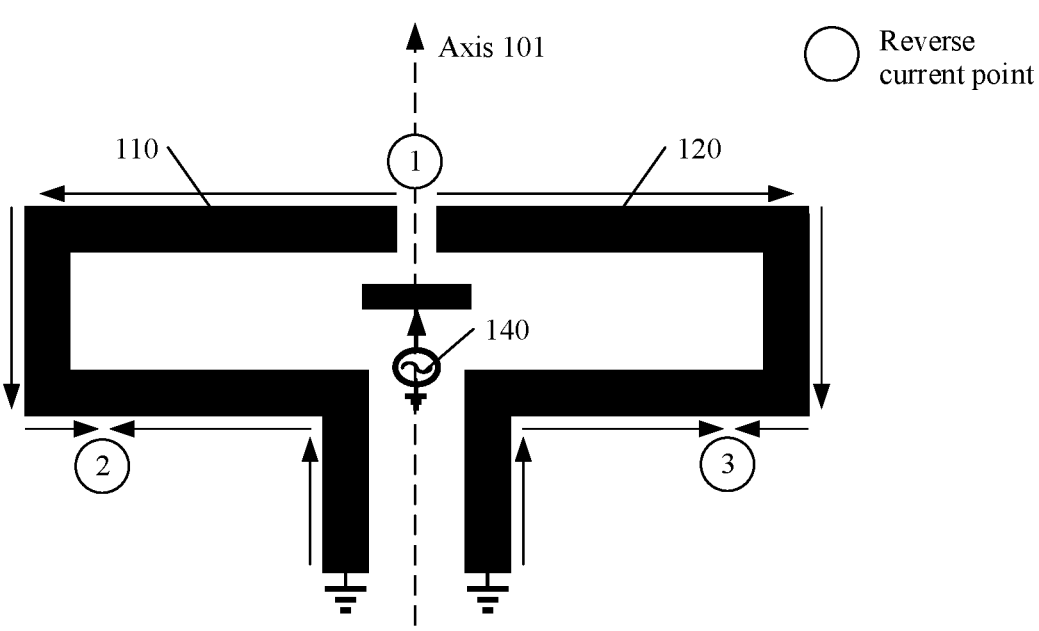
Figure 11:
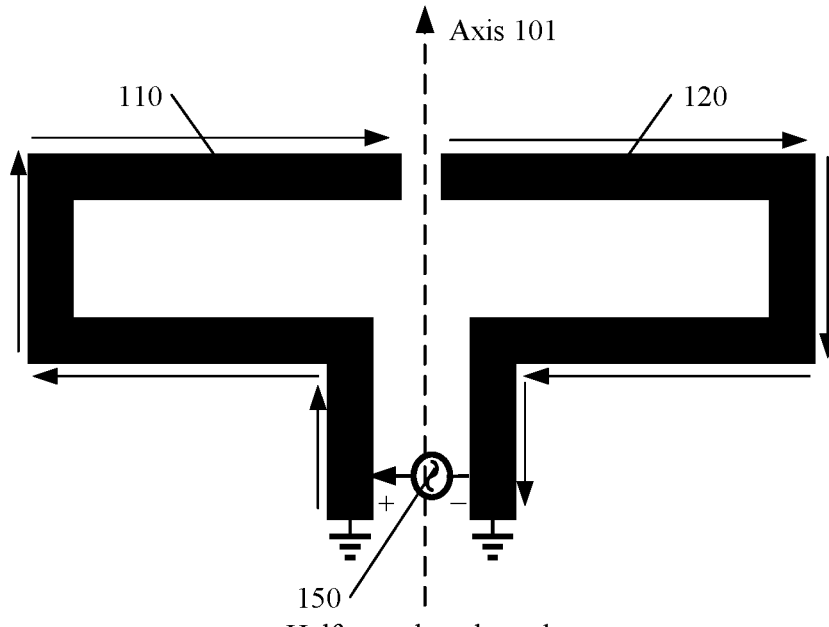
FIG. 11 is a current distribution diagram of a wire loop antenna when a second feed unit is feeding.
Figure 11:
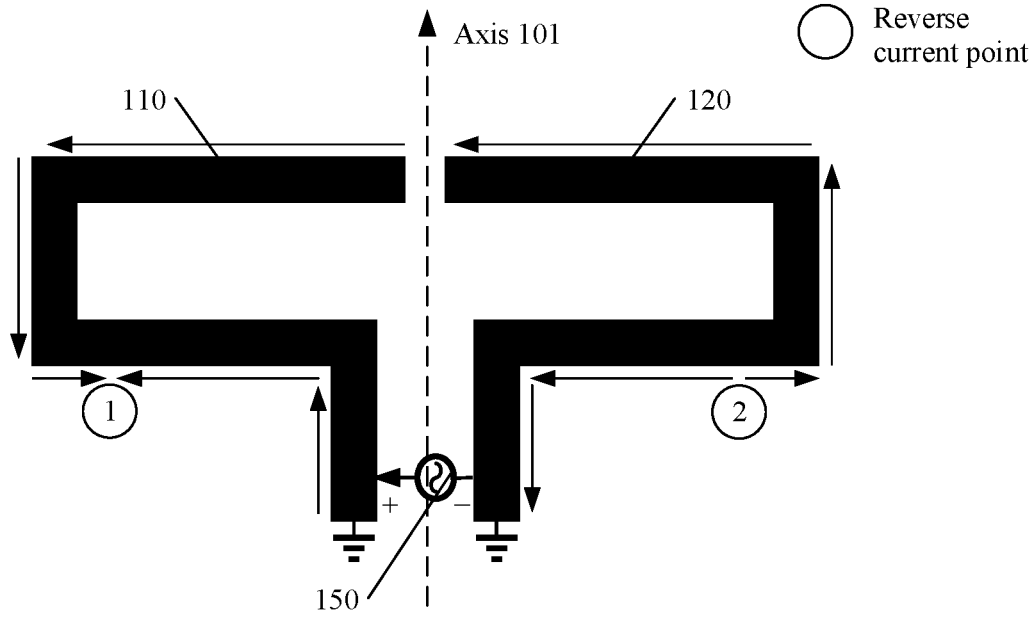

FIG. 10 and FIG. 11 are schematic diagrams of distribution of currents of the wire loop antenna when a feed unit is feeding. FIG. 10 is a current distribution diagram of the wire loop antenna when the first feed unit is feeding. FIG. 11 is a current distribution diagram of the wire loop antenna when the second feed unit is feeding.

As shown in FIG. 10, when the first feed unit 140 feeds the wire loop antenna in the indirect coupling manner (symmetrical feed) by using the metal part, currents on the first radiator 110 and the second radiator 120 are symmetrically distributed along the axis 101.

(a) in FIG. 10 is a schematic diagram of distribution of currents when the first feed unit 140 is feeding and the wire loop antenna operates in a half-wavelength mode. It should be understood that the half-wavelength mode may mean that, when the antenna structure generates resonance, a length of a radiator of the antenna structure is half of a wavelength corresponding to a resonance point of the resonance.

(b) in FIG. 10 is a schematic diagram of distribution of currents when the first feed unit 140 is feeding and the wire loop antenna operates in a three-half-wavelength mode. It should be understood that the three-half-wavelength mode may mean that when the antenna structure generates resonance, a length of a radiator of the antenna structure is three-half of a wavelength corresponding to a resonance point of the resonance.

It should be understood that, when the first feed unit 140 is feeding, there are 2N−1 reverse current points on the first radiator 110 and the second radiator 120. In this case, resonance generated by the wire loop antenna may be defined as a CM mode of an N−½-wavelength. N is a positive integer. For example, as shown in (a) in FIG. 10, there is one reverse current point on the first radiator 110 and the second radiator 120, and the wire loop antenna operates in the half-wavelength mode. As shown in (b) in FIG. 10, there are three reverse current points on the first radiator 110 and the second radiator 120, and the wire loop antenna operates in the three half-wavelength mode. A current distributed on a radiator of the wire loop antenna is an alternating current. An example in which the alternating current is in a sinusoidal form is used for description. The reverse current point may be understood as a zero point of a current in the sinusoidal form. Because phases of the current around the zero point are reverse, the reverse current point occurs. Due to this characteristic, the current on the radiator reaches a maximum value between two zero points, that is, the maximum value of the current is a peak or a trough of the current in the sinusoidal form.

As shown in FIG. 11, the positive electrode and the negative electrode of the second feed unit 150 are directly connected to the first radiator 110 and the second radiator 120 respectively, to feed the wire loop antenna (the anti-symmetrical feed). The currents on the first radiator 110 and the second radiator 120 are anti-symmetrically distributed along the axis 101.

(a) in FIG. 11 is a schematic diagram of distribution of currents when the second feed unit is feeding and the wire loop antenna operates in the half-wavelength mode.

(b) in FIG. 11 is a schematic diagram of distribution of currents when the second feed unit is feeding and the wire loop antenna operates in the three half-wavelength mode.

It should be understood that, when the second feed unit is feeding, there are 2N−2 reverse current points on the first radiator 110 and the second radiator 120. In this case, resonance generated by the wire loop antenna may be defined as a differential mode (differential mode, DM) mode of an N−½-wavelength. N is a positive integer. For example, as shown in (a) in FIG. 11, there are zero reverse current points on the first radiator 110 and the second radiator 120, and the wire loop antenna operates in the half-wavelength mode. As shown in (b) in FIG. 11, there are two reverse current points on the first radiator 110 and the second radiator 120, and the wire loop antenna operates in the three half-wavelength mode.

When the first feed unit and the second feed unit are simultaneously feeding, the wire loop antenna may separately operate in the CM mode and the DM mode, and electric fields correspondingly generated by the wire loop antenna in the CM mode and the DM mode are integrally orthogonal in far field. Integral orthogonality may be understood as that an electric field that generates resonance in the CM mode and the DM mode meets the following formula in the far field:

$$\iint E_1(\theta,\varphi)\square E_2(\theta,\varphi)d\theta d\varphi=0;$$

In the formula, $E_1(\theta,\varphi)$ is a far-field electric field corresponding to resonance generated by the wire loop antenna when the first feed unit is feeding, and corresponds to the CM mode. $E_2(\theta,\varphi)$ is a far-field electric field corresponding to resonance generated by the wire loop antenna when the second feed unit is feeding, and corresponds to the DM mode.

The electric fields corresponding to the resonance generated in the CM mode and the DM mode are integrally orthogonal between the far fields, and do not affect each other. Therefore, there is good isolation between the first feed unit and the second feed unit.

In this case, because there is the good isolation between the first feed unit and the second feed unit, the first feed unit and the second feed unit may operate simultaneously. To be specific, the two feed units of the wire loop antenna may simultaneously perform receiving and sending, simultaneously perform sending, or simultaneously perform receiving, so that the wire loop antenna can meet a requirement of a multi-input multi-output (multi-input multi-output, MIMO) system. The wire loop antenna provided in this embodiment of this application may be used as a co-radiator dual-antenna structure, to meet a requirement of a multi-antenna system.

In addition, because a co-radiator dual-antenna structure may generate different resonance by sharing a same radiator, the two feed units in the antenna structure may operate simultaneously. In addition, the wire loop antenna provided in this embodiment of this application has a compact structure, which greatly reduces a volume required by the dual-antenna structure. Therefore, the wire loop antenna provided in this embodiment of this application can also implement miniaturization of the antenna structure.

Optionally, when the first radiator and the second radiator are asymmetrical to each other with respect to the axis 101, all CM modes and DM modes of the wire loop antenna may be simultaneously excited by using a single feed unit, so that more modes of the wire loop antenna are covered to obtain a wider operating bandwidth. However, in this case, the wire loop antenna can include only one feed unit. If the wire loop antenna includes two feed units, the two feed units can separately excite all CM modes and DM modes, electric fields corresponding to resonance generated by the two feed units are not integrally orthogonal in far field, and isolation between the two feed units is very poor. Therefore, in this case, the wire loop antenna is a wide-band single-antenna structure, and cannot be used as a dual-antenna structure.

Figures 12, 13:
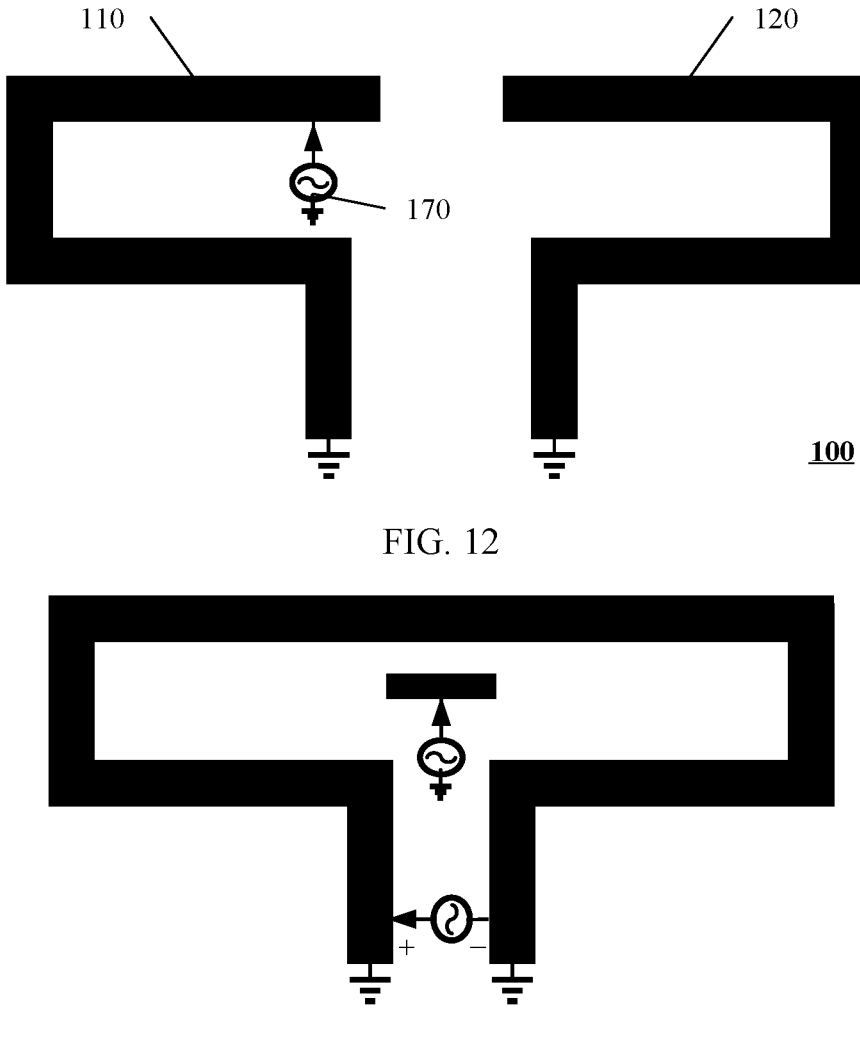
FIG. 12 is a schematic diagram of a structure of asymmetrical feed according to an embodiment of this application.
FIG. 13 is a schematic diagram of a structure of a closed loop antenna.

Optionally, when asymmetrical feed (asymmetrical feed) is performed on the wire loop antenna, all CM modes and DM modes of the wire loop antenna may be simultaneously excited by using a single feed unit, so that more modes of the wire loop antenna are covered to obtain a wider operating bandwidth. As shown in FIG. 12, the electronic device may include a third feed unit 170. The third feed unit 170 may feed, on the first radiator 110, the wire loop antenna 100 in an asymmetrical feed manner. Alternatively, the third feed unit 170 may feed, on the second radiator 120, the wire loop antenna 100 in an asymmetrical feed manner. In the feeding manner, all CM modes and DM modes of the wire loop antenna can be excited to obtain a wider operating bandwidth. However, in this case, the wire loop antenna 100 can include only one feed unit. In this case, the wire loop antenna 100 is a wide-band single-antenna structure, and cannot be used as a dual-antenna structure.

It should be understood that asymmetrical feed may be understood as that one end of a feed unit is connected to a radiator, the other end is grounded, and a connection point between the feed unit and the radiator deviates from a symmetry center of the radiator.

FIG. 13 is a schematic diagram of a structure of a closed loop antenna. As shown in FIG. 13, an antenna structure designed to have the same size as the antenna structure shown in FIG. 6 is used as a comparison structure of an antenna structure provided in this embodiment of this application. A difference between the two lies in that the antenna structure herein does not include a slot and is a complete loop structure.

The antenna structure shown in FIG. 6 is a slitted loop antenna structure, and the antenna structure shown in FIG. 13 is a closed loop antenna structure.

Figure 14:
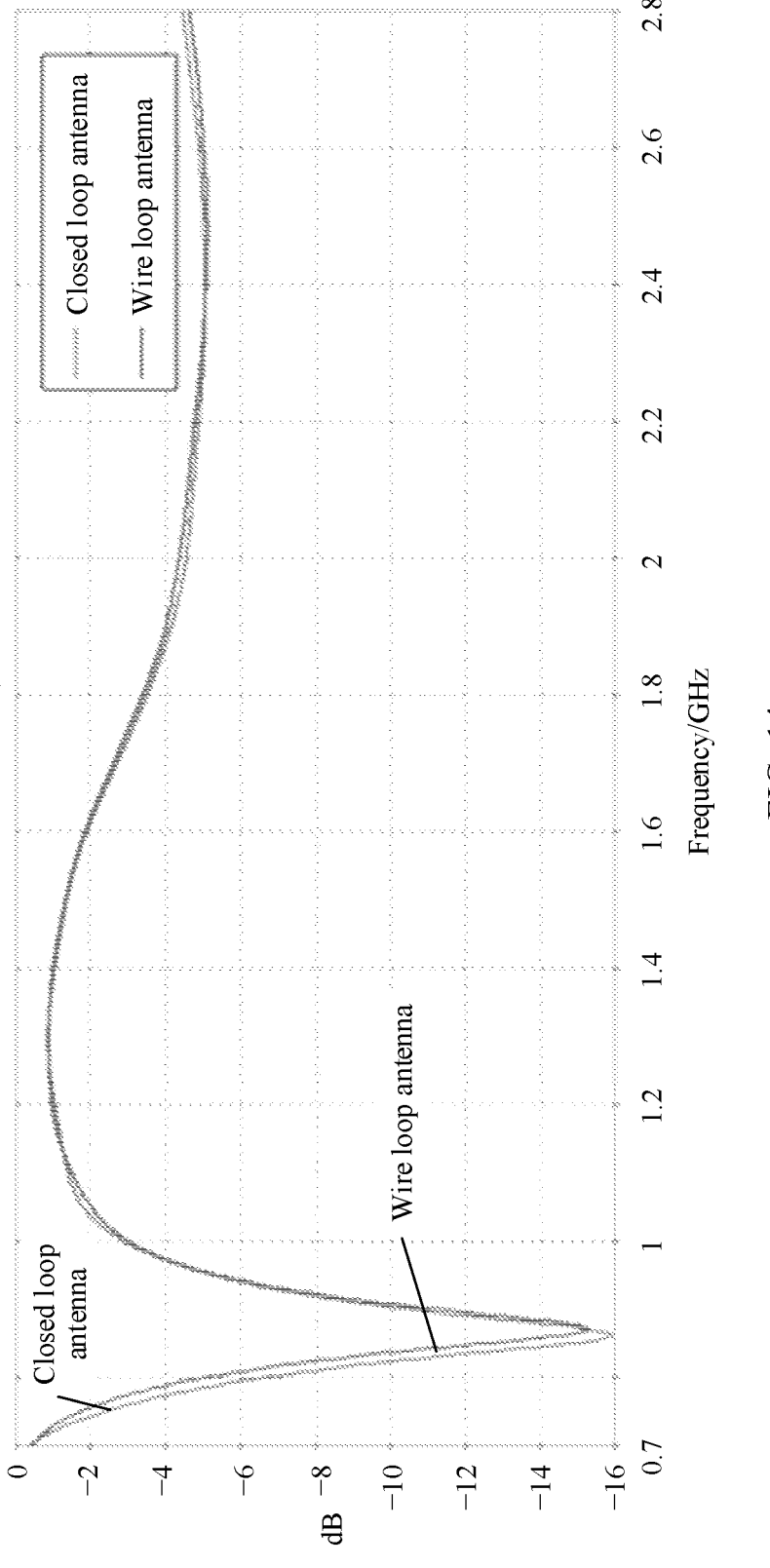
FIG. 14 is a comparison diagram of S parameter simulation results when a first feed unit is feeding.
Figure 15:
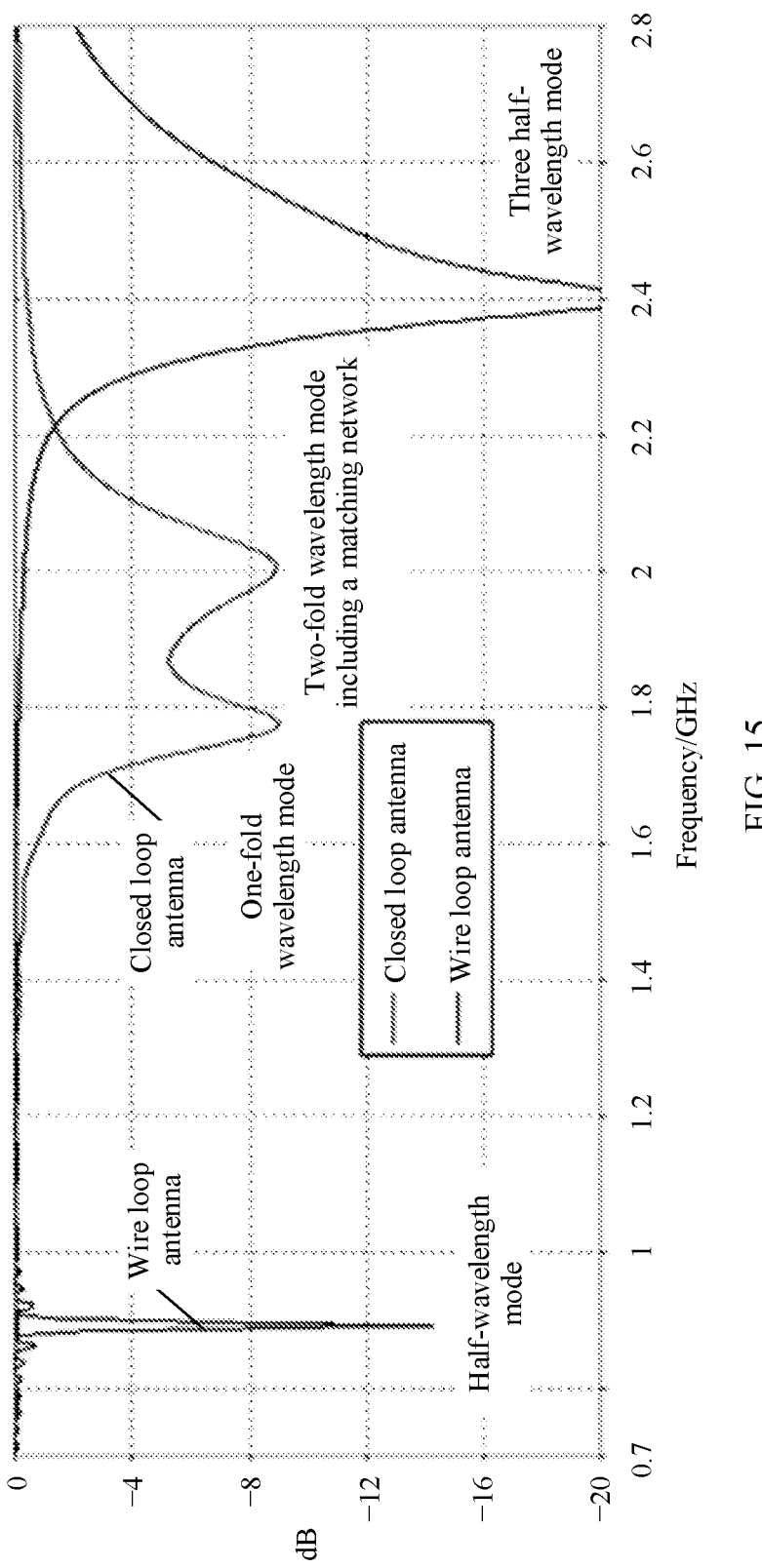
FIG. 15 is a comparison diagram of S parameter simulation results when a second feed unit is feeding.
Figure 16:
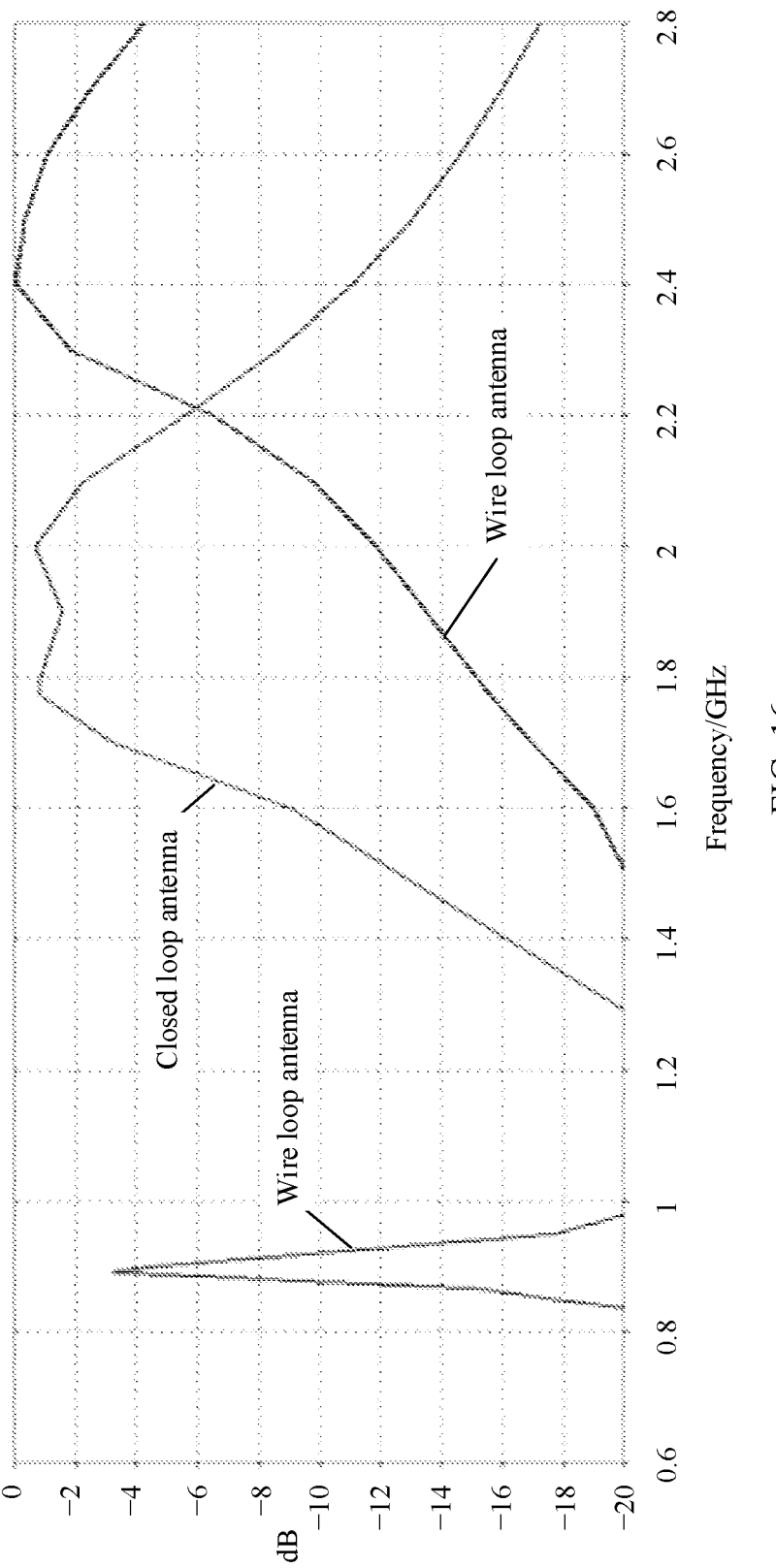
FIG. 16 is a comparison diagram of total efficiency simulation results.

FIG. 14 to FIG. 16 are comparison diagrams of simulation results of the antenna structures shown in FIG. 6 and FIG. 13. FIG. 14 is a comparison diagram of S parameter simulation results when the first feed unit is feeding. FIG. 15 is a comparison diagram of S parameter simulation results when the second feed unit is feeding. FIG. 16 is a comparison diagram of total efficiency (total efficiency) simulation results.

As shown in FIG. 14, when symmetrical feed is performed on the slitted loop antenna structure shown in FIG. 6, a feed unit may excite an N–½-wavelength mode for the slitted loop antenna structure, for example, a half-wavelength mode and a three half-wavelength mode. The feed unit may also excite an N–½-wavelength mode for the closed loop antenna structure shown in FIG. 13, for example, a half-wavelength mode and a three half-wavelength mode.

As shown in FIG. 15, when anti-symmetrical feed is performed on the slitted loop antenna structure shown in FIG. 6, the feed unit may excite an N–½-wavelength mode, for example, a half-wavelength mode and a three half-wavelength mode. The feed unit may also excite an N-wavelength N-wavelength mode for the closed loop antenna structure shown in FIG. 13, for example, a one-wavelength mode and a two-wavelength mode. The lowest mode in which the wire loop antenna provided in this embodiment of this application operates in an anti-symmetrical feed manner is a half-wavelength mode that is lower than the lowest mode for the closed loop antenna structure. In addition, the wire loop antenna has a lower operating frequency band than the closed loop antenna structure when the antenna structures have a same size. Therefore, an operating frequency band corresponding to a half-wavelength mode generated by the slitted loop antenna structure may be used to cover a low frequency band (700 MHz to 960 MHz) in long term evolution (Long Term Evolution, LTE). In addition, an operating frequency band of the wire loop antenna corresponding to the three-half-wavelength mode may be used to cover a relatively high frequency band in LTE, for example, 1700 MHz to 2700 MHz. Therefore, the wire loop antenna provided in this embodiment of this application implements a function of covering a low frequency band while ensuring that a relatively high frequency band is covered in a limited size.

FIG. 16 is a comparison diagram of total efficiency simulation results. When the slitted loop antenna structure shown in FIG. 6 operates in the half-wavelength mode, a corresponding operating frequency band protrudes in the total efficiency curve shown in FIG. 16. Total efficiency of the operating frequency band can meet a requirement for a low frequency band in LTE. In addition, in other operating modes such as a three-half-wavelength mode, system efficiency corresponding to an operating frequency band may also meet a requirement. Therefore, efficiency of the wire loop antenna provided in this embodiment of this application in a frequency band corresponding to generated resonance can meet an actual application requirement.

Figure 17:
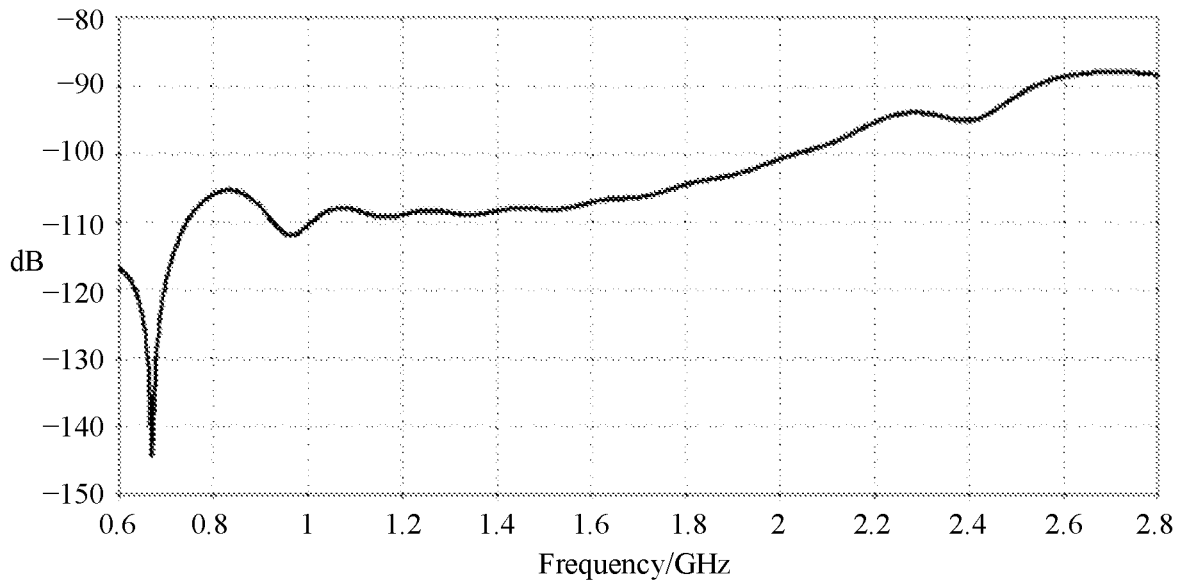
FIG. 17 shows isolation between a first feed unit and a second feed unit of a wire loop antenna shown in FIG. 6.

FIG. 17 is a schematic diagram of S parameter simulation results between a first feed unit and a second feed unit of the wire loop antenna shown in FIG. 6.

It should be understood that, when the first radiator and the second radiator of the wire loop antenna are symmetrical to each other with respect to the axis of the slot, the first feed unit may separately excite the CM mode, but does not excite the DM mode. The second feed unit may separately excite the DM mode, but does not excite the CM mode. That is, the first feed unit and the second feed unit may respectively excite the CM mode and the DM mode. When the first radiator and the second radiator of the wire loop antenna are asymmetrical to each other with respect to the axis, the first feed unit or the second feed unit can simultaneously excite the CM mode and the DM mode, and isolation between the two feed units is very poor. Therefore, the schematic diagram of the S parameter simulation results shown in FIG. 17 is a schematic diagram of the S parameter simulation results of the wire loop antenna obtained when the first radiator and the second radiator are symmetrical to each other with respect to the axis.

As shown in FIG. 17, when the first feed unit is feeding, the wire loop antenna provided in this embodiment of this application operates in the CM mode; and when the second feed unit is feeding, the wire loop antenna provided in this embodiment of this application operates in the DM mode. Electric fields generated by the two modes are integrally orthogonal in far field. Therefore, there is the good isolation between the first feed unit and the second feed unit. The antenna structure provided in this embodiment of this application may be applied to an operating scenario in which high isolation is required. For example, a Wi-Fi frequency band and a BT frequency band belong to a same frequency band, and both have a high sensitivity requirement. To ensure normal operation of an antenna operating in the Wi-Fi frequency band and an antenna operating in the BT frequency band, a same antenna is usually used, and a time division duplex (time-division duplex, TDD) mode is used. However, as a quantity of external devices such as a Bluetooth speaker, a Bluetooth mouse device, and a Bluetooth keyboard of an electronic device increases, use time of the Wi-Fi frequency band is constantly compressed, and a case in which a network is disconnected may occur, which affects user experience. Therefore, it is imperative that the antenna operating in the Wi-Fi frequency band and the antenna operating in the BT frequency band be separately disposed. However, some intra-frequency antennas can simultaneously operate only when isolation between them is high. The isolation between them is about 40 dB. However, when the wire loop antenna provided in this embodiment of this application is used as a co-radiator dual-antenna, the isolation between the first feed unit and the second feed unit is greater than 40 dB. Therefore, the wire loop antenna provided in this embodiment of this application may be used as a co-radiator high-isolation antenna.

It should be understood that the Wi-Fi frequency band and the BT frequency band are merely used as a scenario in which a high-isolation antenna is required for an intra-frequency end. The wire loop antenna provided in this embodiment of this application may also be applied to another scenario in which high isolation is required. This is not limited in this application.

Figure 18:
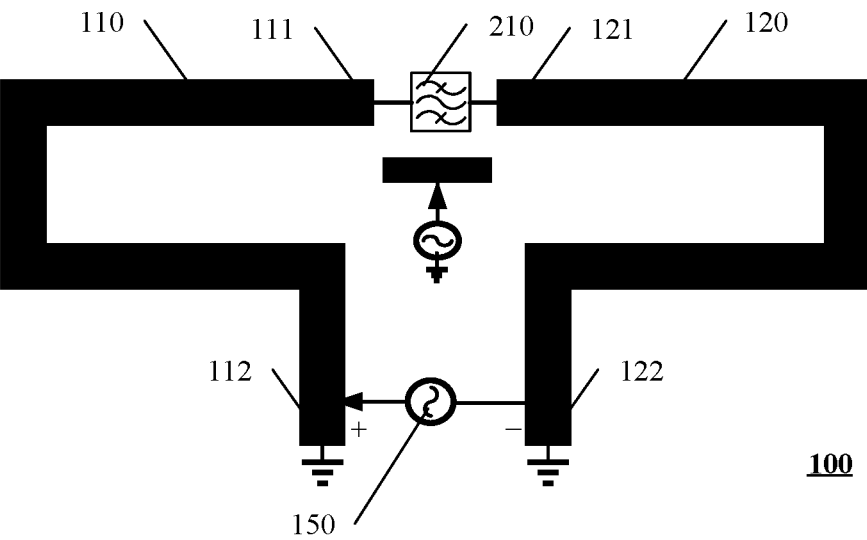
FIG. 18 is a schematic diagram of a structure of another wire loop antenna according to an embodiment of this application.

FIG. 18 is a schematic diagram of a structure of another wire loop antenna according to an embodiment of this application.

As shown in FIG. 18, the electronic device may further include a filter 210. The filter may be disposed in a slot formed between the first end 111 of the first radiator 110 and the first end 121 of the second radiator. One end of the filter 210 is electrically connected to the first end 111 of the first radiator 110, and the other end is electrically connected to the first end 121 of the second radiator.

It should be understood that, when the second feed unit 150 is feeding, the wire loop antenna operates in the DM mode. The filter 210 may have a band-pass characteristic in a frequency band corresponding to resonance generated when the wire loop antenna operates in an N-wavelength mode, that is, the filter 210 is conducted, so that the first radiator 110 is electrically connected to the second radiator 120. In this case, the wire loop antenna is a loop antenna that does not include a slot (closed), and may operate in the N-wavelength mode. The filter 210 may have a band-stop characteristic in a frequency band corresponding to resonance generated when the wire loop antenna operates in an N–½-wavelength mode, that is, the filter 210 is not conducted, so that the first radiator 110 and the second radiator 120 are open-circuited. In this case, the wire loop antenna is a loop antenna including a slot, and may operate in the N–½-wavelength mode. Therefore, when the second feed unit 150 is feeding, the foregoing N-wavelength mode and the foregoing N–½-wavelength mode may be simultaneously excited, to extend an operating bandwidth.

Optionally, the filter 210 may be a surface acoustic wave (surface acoustic wave, SAW) filter, a bulk acoustic wave (bulk acoustic wave, BAW) filter, or a film bulk acoustic resonator (film bulk acoustic resonator, FBAR) filter. Alternatively, the filter 210 may be a filter in another form. This is not limited in this application.

Figure 19:
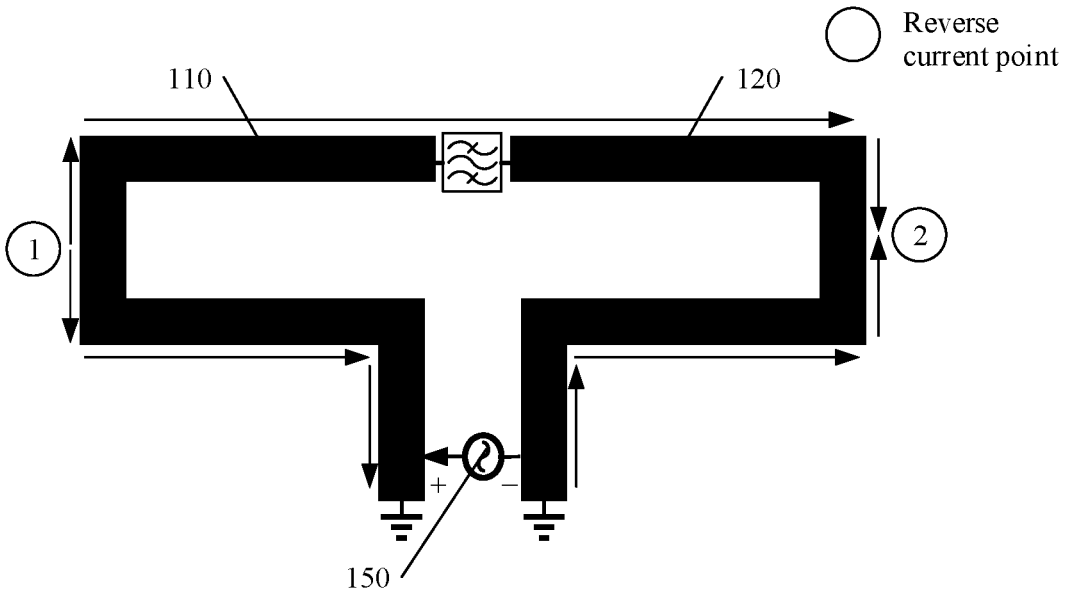
FIG. 19 is a distribution diagram of currents of a wire loop antenna when a filter is conducted.
Figure 19:
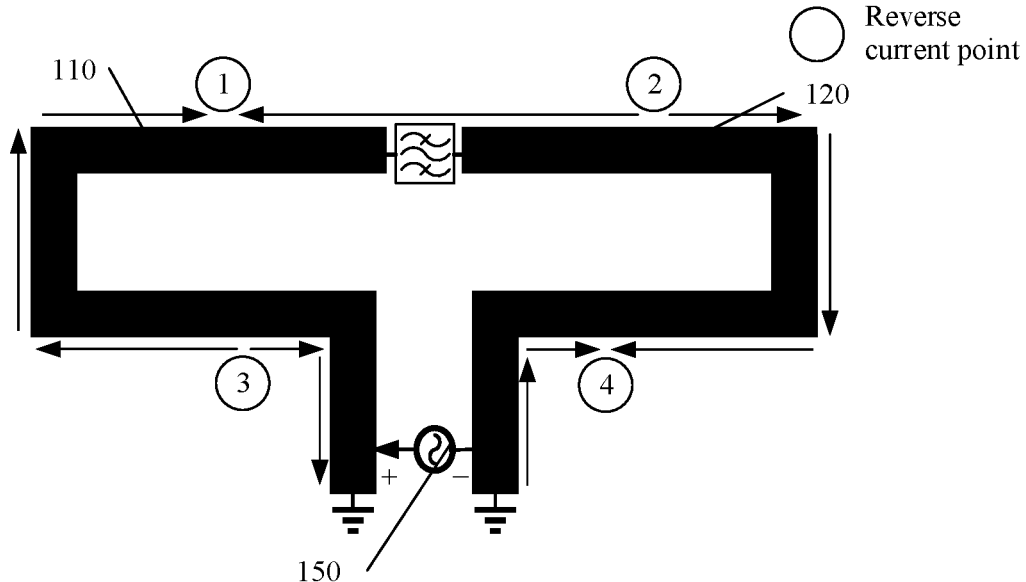

FIG. 19 is a distribution diagram of currents of a wire loop antenna when a filter is conducted.

It should be understood that, when the filter is disposed between the first end of the first radiator 110 and the first end of the second radiator 120 of the wire loop antenna, due to a filtering characteristic of the filter, the wire loop antenna may operate in more modes when the second feed unit 150 is feeding.

As shown in FIG. 11, when the second feed unit 150 is feeding and the filter is not conducted, the first radiator 110 and the second radiator 120 are open-circuited, to form a slitted loop antenna structure. In this case, if there are 2N–2 reverse current points on the first radiator 110 and the second radiator 120, resonance generated by the wire loop antenna may be defined as an N–½-wavelength mode, for example, a half-wavelength mode and a three-half-wavelength mode.

(a) in FIG. 19 shows current distribution of the wire loop antenna operating in the one-wavelength mode. It should be understood that the one-wavelength mode may mean that, when an antenna structure generates resonance, a radiator of the antenna structure is one time as long as a wavelength corresponding to a resonance point of the resonance.

(b) in FIG. 19 shows current distribution of the wire loop antenna operating in a two-wavelength mode. It should be understood that the two-wavelength mode may mean that, when an antenna structure generates resonance, a radiator of the antenna structure is twice as long as a wavelength corresponding to a resonance point of the resonance.

It should be understood that, as shown in FIG. 19, when the second feed unit 150 is feeding and the filter is conducted, the first end of the first radiator 110 is electrically connected to the first end of the second radiator 120 by using the filter, to form a closed loop antenna structure. In this case, if there are 2N reverse current points on the first radiator 110 and the second radiator 120, resonance generated by the wire loop antenna may be defined as a DM mode of N-wavelength. For example, as shown in (a) in FIG. 19, there are two reverse current points on the radiator, and the wire loop antenna operates in the one-wavelength mode. As shown in (b) in FIG. 19, there are four reverse current points on the radiator, and the wire loop antenna operates in the two-wavelength mode.

Figure 20:
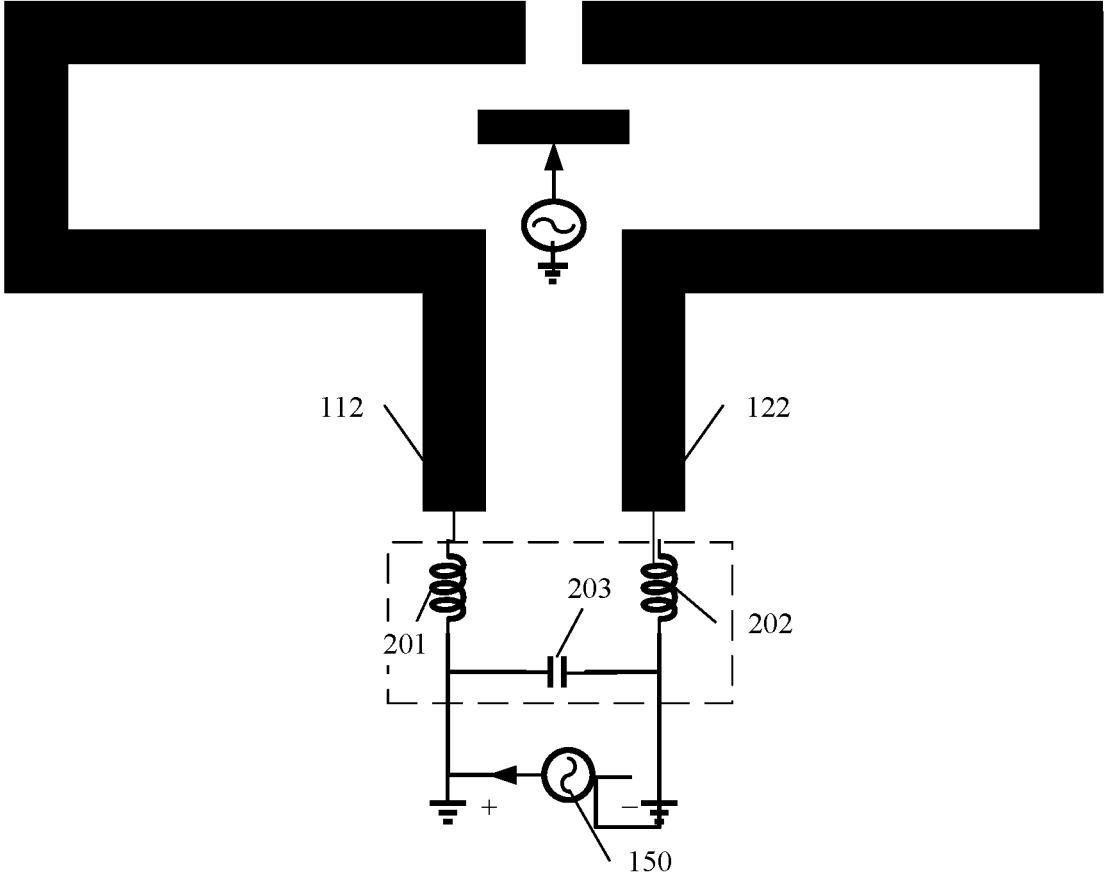
FIG. 20 is a schematic diagram of a matching network according to an embodiment of this application.

FIG. 20 is a schematic diagram of a matching network according to an embodiment of this application.

Optionally, the matching network may be disposed at a feeding position of each feed unit, to adjust a position of a resonance point at which the wire loop antenna generates resonance. In this embodiment provided in this application, the second feed unit is used as an example for description, or the matching network may be disposed at another feed point.

A network that matches the feed unit is added at each feed point, so that a current of another frequency band at the feed point can be suppressed, and overall performance of the antenna can be improved.

Optionally, as shown in FIG. 20, the matching network may include a first inductor 201, a second inductor 202, and a capacitor 203. One end of the first inductor 201 is electrically connected to the second end 112 of the first radiator, and the other end is electrically connected to the positive electrode of the second feed unit 150. One end of the second inductor is electrically connected to the second end 122 of the second radiator, and the other end is electrically connected to the negative electrode of the second feed unit 150. The capacitor 203 may be connected in parallel between the first inductor 201 and the second inductor 202.

Optionally, an inductance value of the first inductor 201 may be from 0.3 nH to 2 nH, an inductance value of the second inductor 202 may be from 0.3 nH to 2 nH, and a capacitance value of the capacitor 203 may be from 0.3 pF to 2 pF.

Optionally, both inductance values of the first inductor 201 and the second inductor 202 may be 0.7 nH, and the capacitance value of the capacitor 203 may be 0.6 pF.

It should be understood that a specific form of the matching network is not limited in this application, and the matching network may alternatively be a series-connected capacitor, a parallel-connected inductor, or the like.

Figure 21:
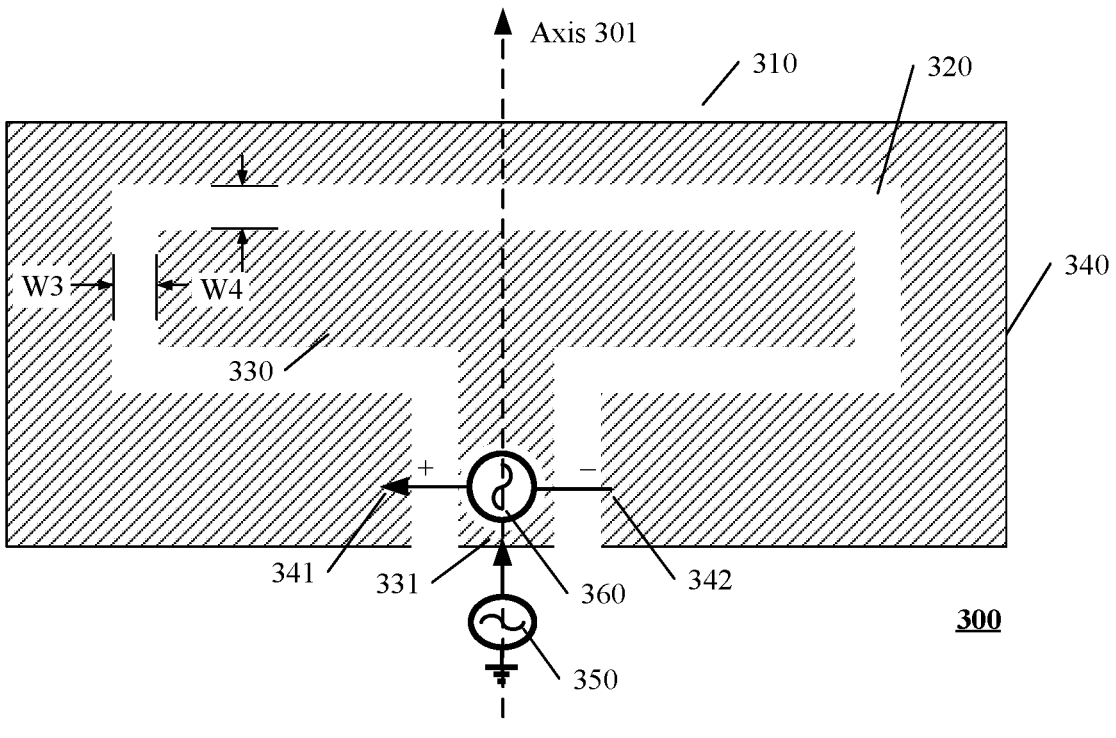
FIG. 21 is a schematic diagram of a structure of a slot loop antenna according to an embodiment of this application.

FIG. 21 is a schematic diagram of a structure of a slot loop antenna according to an embodiment of this application. The slot loop antenna may be used in the electronic device shown in FIG. 1.

As shown in FIG. 21, the electronic device may include a metal part 310.

An annular slot 320 is disposed on the metal part 310, and two ends of the annular slot 320 are disposed adjacent to each other. The annular slot 320 divides the metal part 310 into a first area 330 and a second area 340, and the first area 330 is of a T-shaped structure. The annular slot 320 forms a slot loop antenna 300.

It should be understood that the first area 330 and the second area 340 are two areas that are not connected to each other, and there is no direct electrical connection between the first area 330 and the second area 340.

The T-shaped structure of the first area 330 of the metal part 310 may be a spatial structure. Because space in the electronic device becomes increasingly small, the slot loop antenna 300 may be disposed in a folded manner, that is, the metal part 310 may be folded according to a production or design requirement.

Optionally, the metal part 310 may be a metal rear cover of the electronic device, the metal bezel of the electronic device, a metal layer on an antenna support, or a metal layer on the PCB. This is not limited in this application.

Optionally, the first area 330 and the second area 340 may be symmetrical to each other with respect to an axis 301 of the first area 330.

Optionally, a width of each part of the annular slot 320 may be different. The width of each part of the annular slot 320 may be adjusted, to adjust a resonance point at which the slot loop antenna generates resonance. For example, a width W3 of the annular slot 320 in a horizontal direction may be different from a width W4 of the annular slot 320 in a vertical direction. The horizontal direction or the vertical direction may be perpendicular to the axis 301, or may be parallel to a direction of the bezel or the PCB of the electronic device. This is not limited in this application, and is merely used as an example. In addition, the annular slot 320 may be symmetrical with respect to the axis 301. It should be understood that a more symmetrical structure can enable the antenna to obtain better isolation as a whole.

Optionally, the electronic device may further include a fourth feed unit 350. A first feed point 331 may be disposed in the first area 330, and the fourth feed unit 350 may feed the slot loop antenna 300 at the first feed point 331. The first feed point 331 may be disposed on the axis 301, and may be disposed at a position close to the two ends of the annular slot 320. The fourth feed unit 350 feeds the slot loop antenna 300 in a symmetrical feed manner.

Optionally, the fourth feed unit 350 may feed the slot loop antenna 300 in an indirect coupling manner at the first feed point 331 by using a metal part. To implement an indirect coupling feeding structure, a metal patch may also be designed on the PCB of the electronic device. After the metal patch is disposed on the PCB, a distance between the metal patch and the first area becomes larger. Therefore, a coupling area may be correspondingly increased to achieve a same effect.

It should be understood that indirect coupling, namely, interspace coupling, is a concept relative to direct coupling, and means that a direct electrical connection is not used. Direct coupling means a direct electrical connection, and direct feeding at a feed point.

Optionally, the electronic device may further include a fifth feed unit 360. A second feed point 341 and a third feed point 342 may be disposed in the second area 340. A positive electrode of the fifth feed unit 360 is electrically connected to the metal part 310 at the second feed point 341, and a negative electrode of the fifth feed unit 360 is electrically connected to the metal part 310 at the third feed point 342. The second feed point 341 and the third feed point 342 may be symmetrical to each other with respect to the axis 301. The second feed point 341 may be disposed at a position close to one end of the annular slot 320, and the third feed point 342 may be disposed at a position close to the other end of the annular slot 320. The fifth feed unit 360 feeds the slot loop antenna 300 in the anti-symmetrical feed manner.

Figure 22:
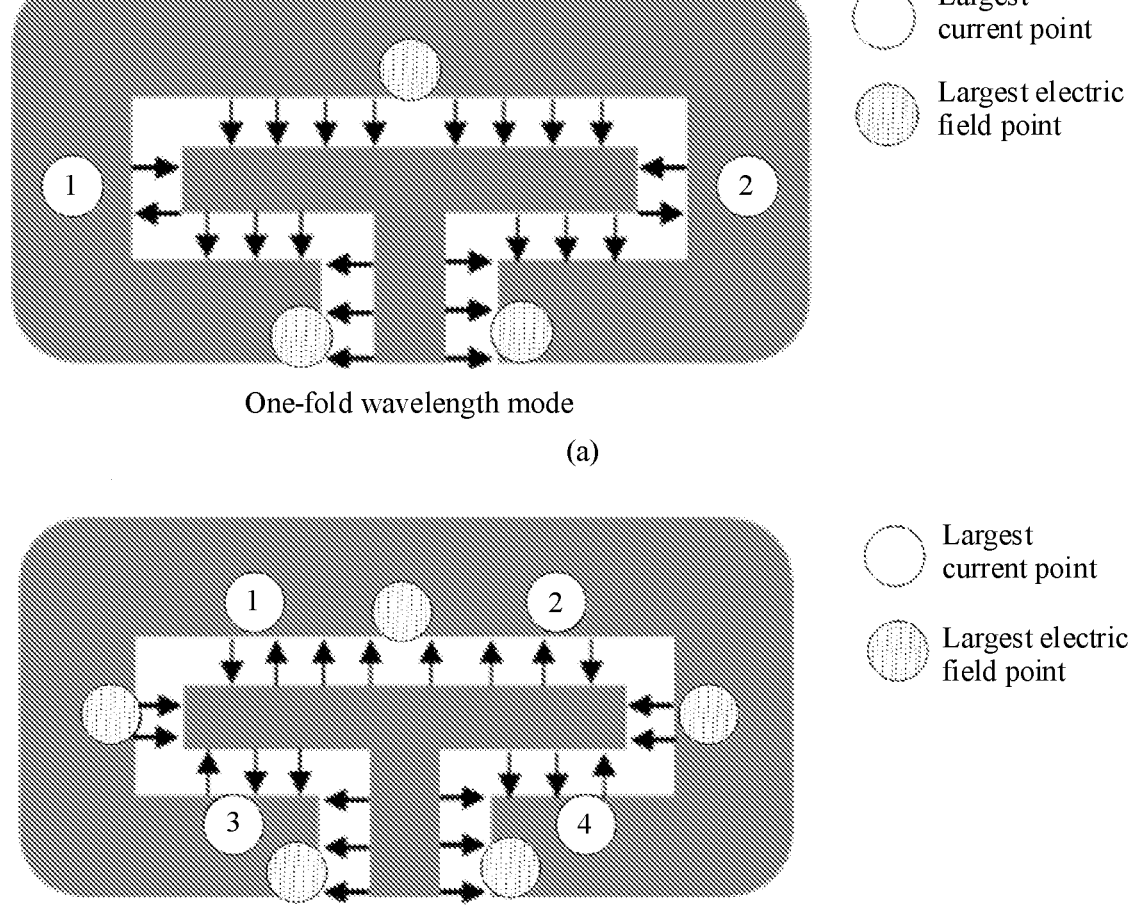
FIG. 22 is a distribution diagram of currents and electric fields of a slot loop antenna when a fourth feed unit is feeding.
Figure 23:
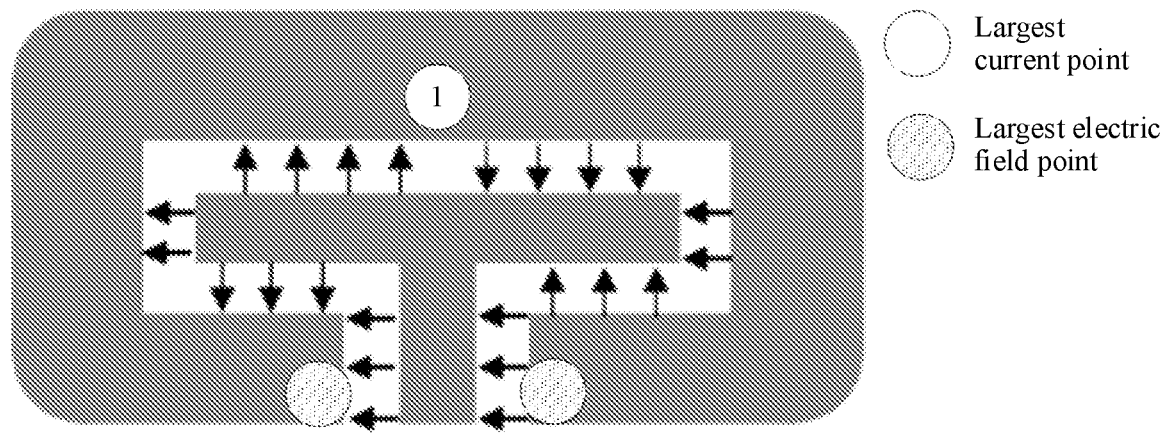
FIG. 23 is a distribution diagram of currents and electric fields of a slot loop antenna when a fifth feed unit is feeding.
Figure 23:
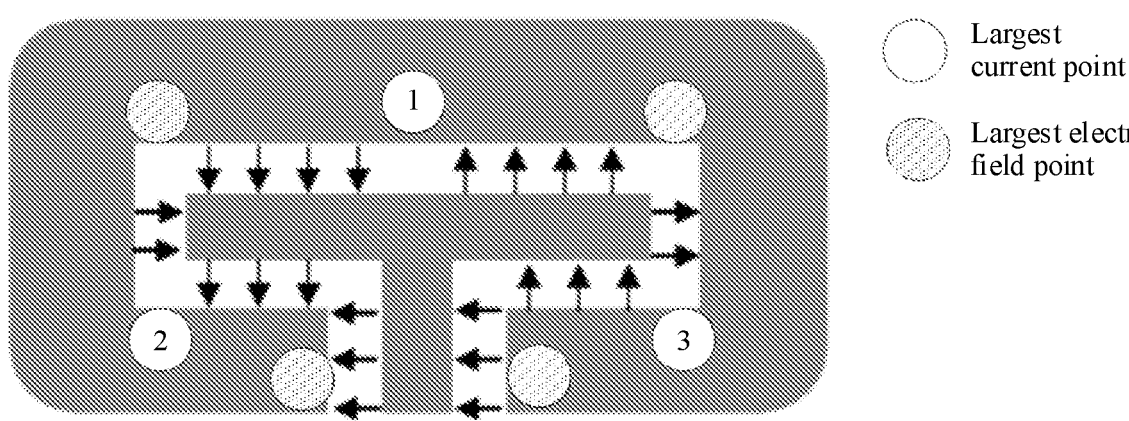

FIG. 22 and FIG. 23 are schematic diagrams of distribution of currents and electric fields of a slot loop antenna when a feed unit is feeding. FIG. 22 is a distribution diagram of currents and electric fields of a slot loop antenna when a fourth feed unit is feeding. FIG. 23 is a distribution diagram of currents and electric fields of a slot loop antenna when a fifth feed unit is feeding.

As shown in FIG. 22, when the fourth feed unit feeds the slot loop antenna in the indirect coupling manner (symmetrical feed), electric fields of an annular slot are symmetrically distributed with respect to an axis of the first area.

(a) in FIG. 22 is a schematic diagram of distribution of electric fields of the annular slot when the fourth feed unit is feeding and the slot loop antenna operates in a one-wavelength mode.

(b) in FIG. 22 is a schematic diagram of distribution of electric fields of the annular slot when the fourth feed unit is feeding and the slot loop antenna operates in a two-wavelength mode.

It should be understood that, when the fourth feed unit is feeding, there are 2N reverse electric field points in the annular slot. In this case, resonance generated by the slot loop antenna may be defined as a DM mode of an N-wavelength. N is a positive integer. The electric field distributed in the annular slot of the slot loop antenna is an alternating electric field. An example in which the alternating electric field is in a sinusoidal form is used for description. A reverse electric field point may be understood as a zero point of an electric field in the sinusoidal form. Because phases of the electric field around the zero point are reverse, the reverse electric field point occurs. Due to this characteristic, the electric field of the annular slot reaches a maximum value between two zero points, that is, the maximum value is a peak or a trough of the electric field in the sinusoidal form. In addition, because there is a correspondence between the electric field of the annular slot and a current on the metal part, an electric field corresponding to a largest current is the smallest, and a current corresponding to a largest electric field is the smallest. Therefore, a largest current point in FIG. 22 may be considered as a zero point of an electric field, namely, a reverse electric field point. For example, as shown in (a) in FIG. 22, there are two reverse electric field points in the annular slot, and the slot loop antenna operates in the one-wavelength mode. As shown in (b) in FIG. 22, there are four reverse electric field points in the annular slot, and the slot loop antenna operates in the two-wavelength mode.

As shown in FIG. 23, when a second feed point and a third feed point are respectively fed (anti-symmetrical feed) by using a positive electrode and a negative electrode of the fifth feed unit, electric fields of the annular slot are anti-symmetrically distributed with respect to the axis of the first area.

(a) in FIG. 23 is a schematic diagram of distribution of electric fields of the annular slot when the fifth feed unit is feeding and the slot loop antenna operates in a half-wavelength mode.

(b) in FIG. 23 is a schematic diagram of distribution of electric fields of the annular slot when the fifth feed unit is feeding and the slot loop antenna operates in a three-half-wavelength mode.

It should be understood that, when the fifth feed unit is feeding, there are 2N-1 reverse electric field points in the annular slot. In this case, resonance generated by the slot loop antenna may be defined as a CM mode of an N-½-wavelength. N is a positive integer. For example, as shown in (a) in FIG. 23, there is one reverse electric field point in the annular slot, and the slot loop antenna operates in the half-wavelength mode. As shown in (b) in FIG. 23, there are two reverse electric field points in the annular slot, and the slot loop antenna operates in the three-half-wavelength mode.

When the fourth feed unit and the fifth feed unit are simultaneously feeding, the slot loop antenna separately operates in the DM mode and the CM mode, and electric fields correspondingly generated in the two modes are integrally orthogonal in far field. The electric fields corresponding to the resonance generated in the CM mode and the DM mode are integrally orthogonal between the far fields, and do not affect each other. Therefore, there is good isolation between the fourth feed unit and the fifth feed unit.

In this case, because there is the good isolation between the fourth feed unit and the fifth feed unit, the fourth feed unit and the fifth feed unit may operate simultaneously. To be specific, the two feed units of the slot loop antenna may simultaneously perform receiving and sending, simultaneously perform sending, or simultaneously perform receiving, so that the slot loop antenna can meet a requirement of a MIMO system. The slot loop antenna provided in this embodiment of this application may be used as a co-radiator dual-antenna structure, to meet a requirement of a multi-antenna system.

In addition, because the co-radiator dual-antenna structure may generate different resonance by sharing a same radiator, the antenna structure may operate in different frequency bands. In addition, the slot loop antenna provided in this embodiment of this application has a compact structure, which greatly reduces a volume required by the dual-antenna structure. Therefore, the slot loop antenna provided in this embodiment of this application can also implement miniaturization of the antenna structure.

Optionally, when the first area and the second area on the metal part are asymmetrical to each other with respect to the axis of the first area, all CM modes and DM modes of the slot loop antenna may be simultaneously excited by using a single feed unit, so that more modes of the slot loop antenna are covered to obtain a wider operating bandwidth. However, in this case, the slot loop antenna can include only one feed unit. If the slot loop antenna includes two feed units, the two feed units can separately excite all CM modes and DM modes, electric fields corresponding to resonance generated by the two feed units are not integrally orthogonal in far field, and isolation between the two feed units is very poor. Therefore, in this case, the slot loop antenna is a wide-band single-antenna structure, and cannot be used as a dual-antenna structure.

Figures 24, 25:
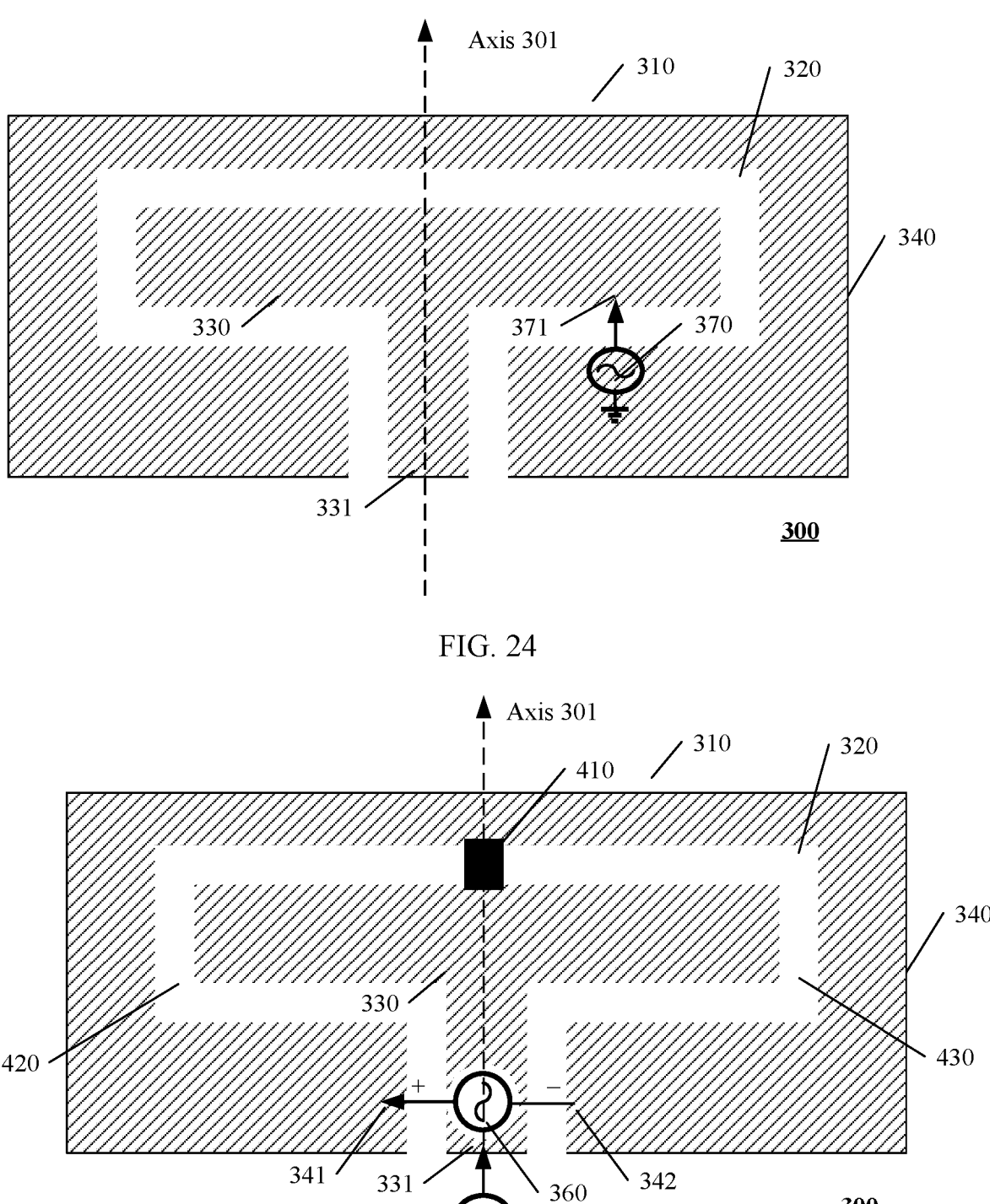
FIG. 24 is a schematic diagram of a structure of asymmetrical feed according to an embodiment of this application.
FIG. 25 is a schematic diagram of a structure of another slot loop antenna according to an embodiment of this application.

Optionally, when asymmetrical feed is performed on the slot loop antenna, all CM modes and DM modes of the slot loop antenna may be simultaneously excited by using a single feed unit, so that more modes of the slot loop antenna are covered to obtain a wider operating bandwidth. As shown in FIG. 24, the electronic device may include a sixth feed unit 370, and a fourth feed point 371 may be disposed on the metal part 310. The fourth feed point 371 may be located in the first area 330, and the sixth feed unit 370 feeds the slot loop antenna 300 in the asymmetrical feed manner. Alternatively, the fourth feed point 371 may be located in the second area 340, and the sixth feed unit 370 feeds the slot loop antenna 300 in the asymmetrical feed manner. In the feeding manner, all CM modes and DM modes of the slot loop antenna can be excited to obtain a wider operating bandwidth. However, in this case, the slot loop antenna 300 can include only one feed unit. In this case, the slot loop antenna 300 is a wide-band single-antenna structure, and cannot be used as a dual-antenna structure.

FIG. 25 is a schematic diagram of a structure of another slot loop antenna according to an embodiment of this application.

As shown in FIG. 25, the electronic device may further include a connecting piece 410.

The connecting piece 410 is configured to connect the first area 330 and the second area 340, so that the first area 330 is electrically connected to the second area 340. The connecting piece 410 divides the annular slot 320 into a first slot 420 and a second slot 430.

Optionally, the connecting piece 410 may be located on the axis 301 of the first area 330, and the first slot 420 and the second slot 430 may be located on both sides of the axis 301.

Optionally, the connecting piece 410 and the metal part 310 may be of an integrated structure. To be specific, when the slot loop antenna is prepared, the first slot 420 and the second slot 430 are directly prepared, and a joint between the first area 330 and the second area 340 is reserved.

It should be understood that the slot loop antenna shown in FIG. 25 and the wire loop antenna shown in FIG. 6 are structurally complementary. Therefore, specifically, distribution of a current in the wire loop antenna has a same feature as an equivalent distribution of a magnetic current in the slot loop antenna.

Figure 26:
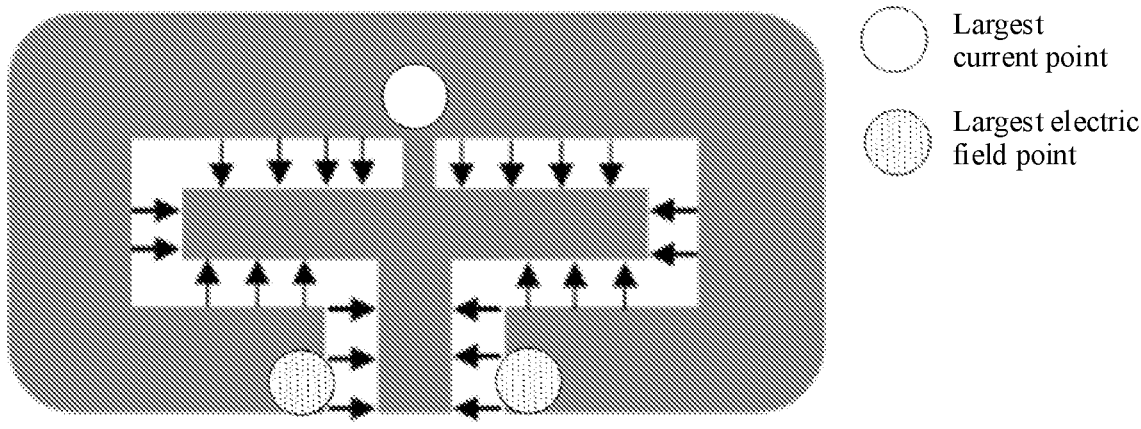
FIG. 26 is a distribution diagram of currents and electric fields of a slot loop antenna when a fourth feed unit is feeding.
Figure 26:
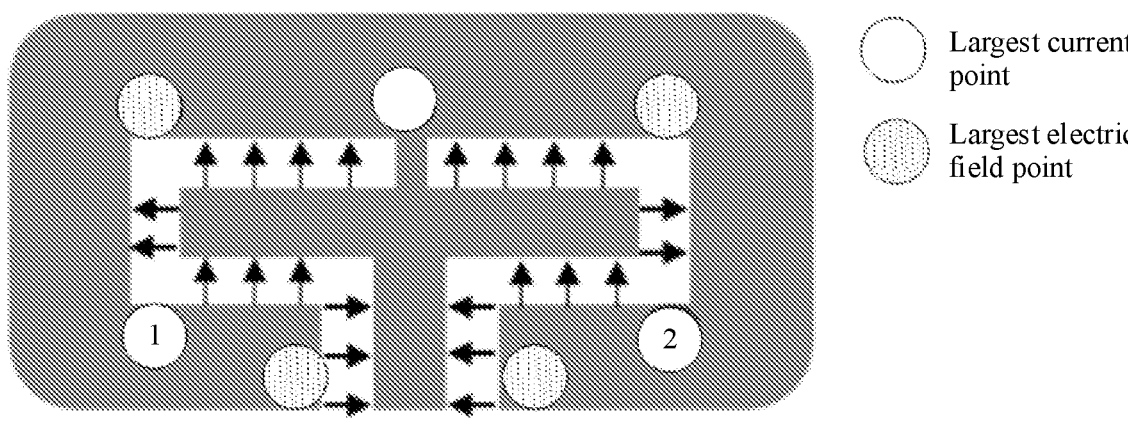
Figure 27:
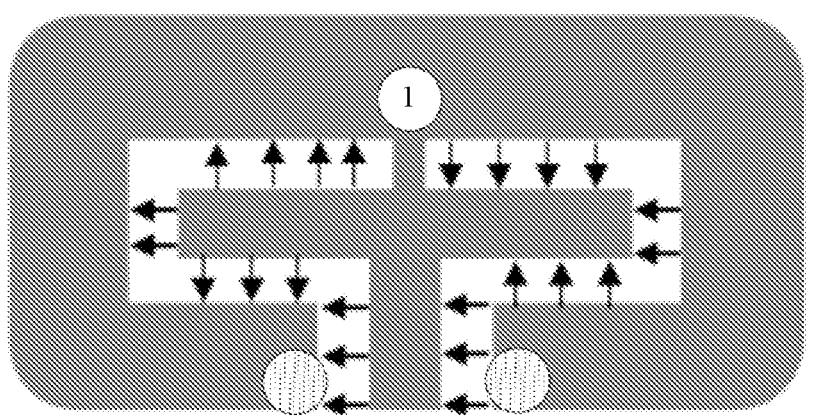
FIG. 27 is a distribution diagram of currents and electric fields of a slot loop antenna when a fifth feed unit is feeding.
Figure 27:
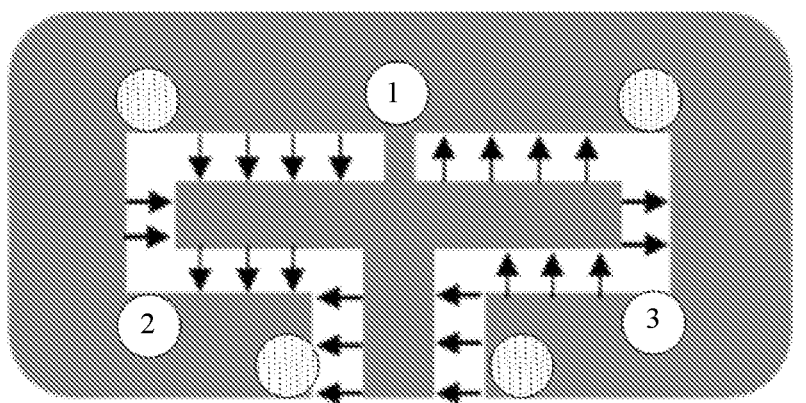
Figure 27:
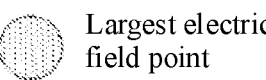

FIG. 26 and FIG. 27 are schematic diagrams of distribution of currents and electric fields of a slot loop antenna when a feed unit is feeding. FIG. 26 is a distribution diagram of currents and electric fields of a slot loop antenna when a fourth feed unit is feeding. FIG. 27 is a distribution diagram of currents and electric fields of a slot loop antenna when a fifth feed unit is feeding;

As shown in FIG. 26, when the fourth feed unit feeds the slot loop antenna in an indirect coupling manner (symmetrical feed) by using a metal part, electric fields of an annular slot are symmetrically distributed with respect to an axis of a first area.

(a) in FIG. 26 is a schematic diagram of distribution of currents and electric fields of the annular slot when the fourth feed unit is feeding and the slot loop antenna operates in a half-wavelength mode.

(b) in FIG. 26 is a schematic diagram of distribution of currents and electric fields of the annular slot when the fourth feed unit is feeding and the slot loop antenna operates in a three-half-wavelength mode.

It should be understood that, when the fourth feed unit is feeding, there are 2N−2 reverse electric field points in the annular slot. In this case, resonance generated by the slot loop antenna may be defined as a DM mode of an N−½-wavelength. N is a positive integer. The electric field distributed in the annular slot of the slot loop antenna is an alternating electric field. An example in which the alternating electric field is in a sinusoidal form is used for description. A reverse electric field point may be understood as a zero point of an electric field in the sinusoidal form. Because phases of the electric field around the zero point are reverse, the reverse electric field point occurs. Due to this characteristic, the electric field of the annular slot reaches a maximum value between two zero points, that is, the maximum value is a peak or a trough of the electric field in the sinusoidal form. In addition, because there is a correspondence between the electric field of the annular slot and a current on the metal part, an electric field corresponding to a largest current is the smallest, and a current corresponding to a largest electric field is the smallest. Therefore, a largest current point in FIG. 22 may be considered as a zero point of an electric field, namely, a reverse electric field point.

However, it should be noted that, for the slot loop antenna shown in FIG. 25, a connecting piece is added, so that the first area is electrically connected to the second area. When the fourth feed unit is feeding, a current flows to the second area along the first area by using the connecting piece, and then flows to a direction of the first slot direction and a direction of the second slot. Therefore, a strong current point appears in a connection area between the connecting piece and the second area. As shown in FIG. 26, the strong current point herein is not a zero point of an electric field, and the electric field is not reverse. For example, as shown in (a) in FIG. 26, there are 0 reverse electric field points in the annular slot, and the slot loop antenna operates in the half-wavelength mode. As shown in (b) in FIG. 26, there are two reverse electric field points in the annular slot, and the slot loop antenna operates in the three-half-wavelength mode.

As shown in FIG. 27, when a second feed point and a third feed point are respectively fed (anti-symmetrical feed) by using a positive electrode and a negative electrode of the fifth feed unit, electric fields of the annular slot are anti-symmetrically distributed with respect to the axis of the first area.

(a) in FIG. 27 is a schematic diagram of distribution of currents and electric fields of the annular slot when the fifth feed unit is feeding and the slot loop antenna operates in the half-wavelength mode.

(b) FIG. 27 is a schematic diagram of distribution of currents and electric fields of the annular slot when the fifth feed unit is feeding and the slot loop antenna operates in the three-half-wavelength mode.

It should be understood that, when the fifth feed unit is feeding, there are $2N-1$ reverse electric field points in the annular slot. In this case, resonance generated by the slot loop antenna may be defined as a CM mode of an $N-\frac{1}{2}$-wavelength. N is a positive integer. For example, as shown in (a) in FIG. 27, there is one reverse electric field point in the annular slot, and the slot loop antenna operates in the half-wavelength mode. As shown in (b) in FIG. 27, there are three reverse electric field points in the annular slot, and the slot loop antenna operates in the three-half-wavelength mode.

When the fourth feed unit and the fifth feed unit are simultaneously feeding, the slot loop antenna may separately operate in the DM mode and the CM mode, and electric fields correspondingly generated in the two modes are integrally orthogonal in far field. The electric fields corresponding to the resonance generated in the CM mode and the DM mode are integrally orthogonal between the far fields, and do not affect each other. Therefore, there is good isolation between the fourth feed unit and the fifth feed unit.

In this case, because there is the good isolation between the fourth feed unit and the fifth feed unit, the fourth feed unit and the fifth feed unit may operate simultaneously. To be specific, the two feed units of the slot loop antenna may simultaneously perform receiving and sending, simultaneously perform sending, or simultaneously perform receiving, so that the slot loop antenna can meet a requirement of a MIMO system. The slot loop antenna provided in this embodiment of this application may be used as a co-radiator dual-antenna structure, to meet a requirement of a multi-antenna system.

In addition, because the co-radiator dual-antenna structure may generate different resonance by sharing a same radiator, the antenna structure may operate in different frequency bands. In addition, the slot loop antenna provided in this embodiment of this application has a compact structure, which greatly reduces a volume required by the dual-antenna structure. Therefore, the slot loop antenna provided in this embodiment of this application can also implement antenna miniaturization.

Optionally, when the first area, the second area, and the connecting piece on the metal part are asymmetrical with respect to the axis of the first area, or the first slot and the second slot are asymmetrical to each other with respect to the axis of the first area, all CM modes and DM modes of the slot loop antenna may be simultaneously excited by using a single feed unit, so that more modes of the slot loop antenna are covered to obtain a wider operating bandwidth. However, in this case, the slot loop antenna can include only one feed unit. If the slot loop antenna includes two feed units, the two feed units can separately excite all CM modes and DM modes, electric fields corresponding to resonance generated by the two feed units are not integrally orthogonal in far field, and isolation between the two feed units is very poor. Therefore, in this case, the slot loop antenna is a wide-band single-antenna structure, and cannot be used as a dual-antenna structure.

Figure 28:
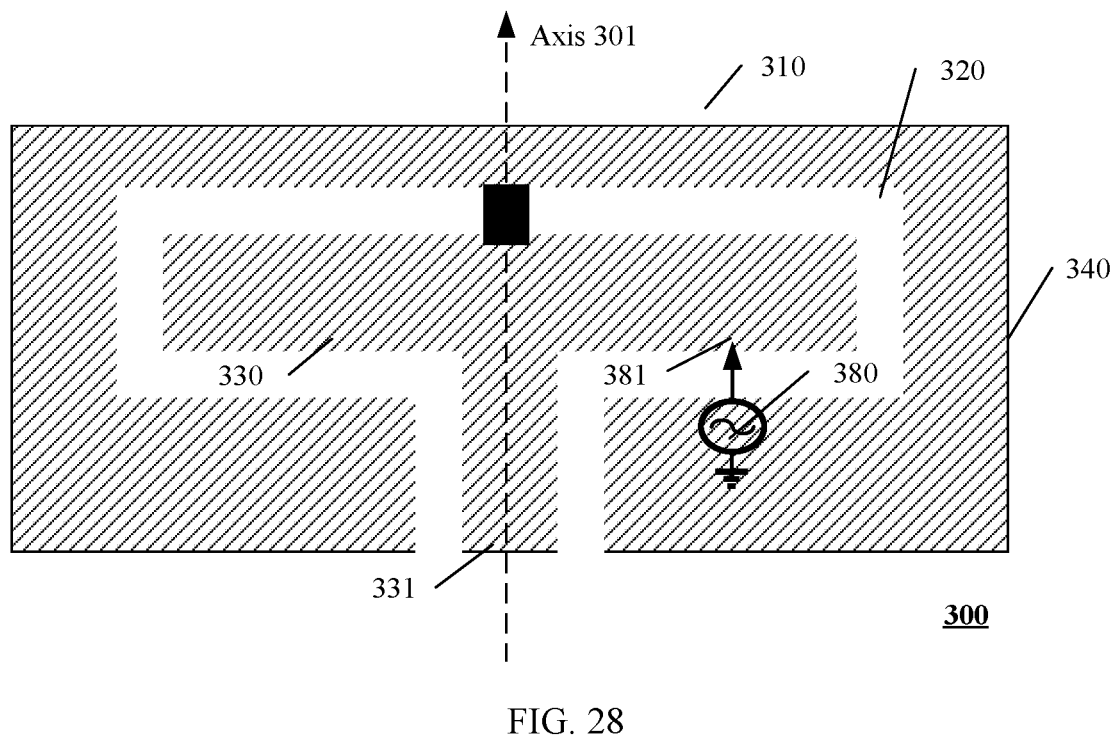
FIG. 28 is a schematic diagram of a structure of asymmetrical feed according to an embodiment of this application.

Optionally, when asymmetrical feed is performed on the slot loop antenna, all CM modes and DM modes of the slot loop antenna may be simultaneously excited by using a single feed unit, so that more modes of the slot loop antenna are covered to obtain a wider operating bandwidth. As shown in FIG. 28, the electronic device may include a seventh feed unit 380, and a fifth feed point 381 may be disposed on the metal part 310. The fifth feed point 381 may be located in the first area 330 to feed the slot loop antenna 300, and the seventh feed unit 380 feeds the slot loop antenna 300 in an asymmetrical feed manner. Alternatively, the fifth feed point 381 may be located in the second area 340, and the seventh feed unit 380 feeds the slot loop antenna 300 in an asymmetrical feed manner. In the feeding manner, all CM modes and DM modes of the slot loop antenna can be excited to obtain a wider operating bandwidth. However, in this case, the slot loop antenna 300 can include only one feed unit. In this case, the slot loop antenna 300 is a wide-band single-antenna structure, and cannot be used as a dual-antenna structure.

Figure 29:
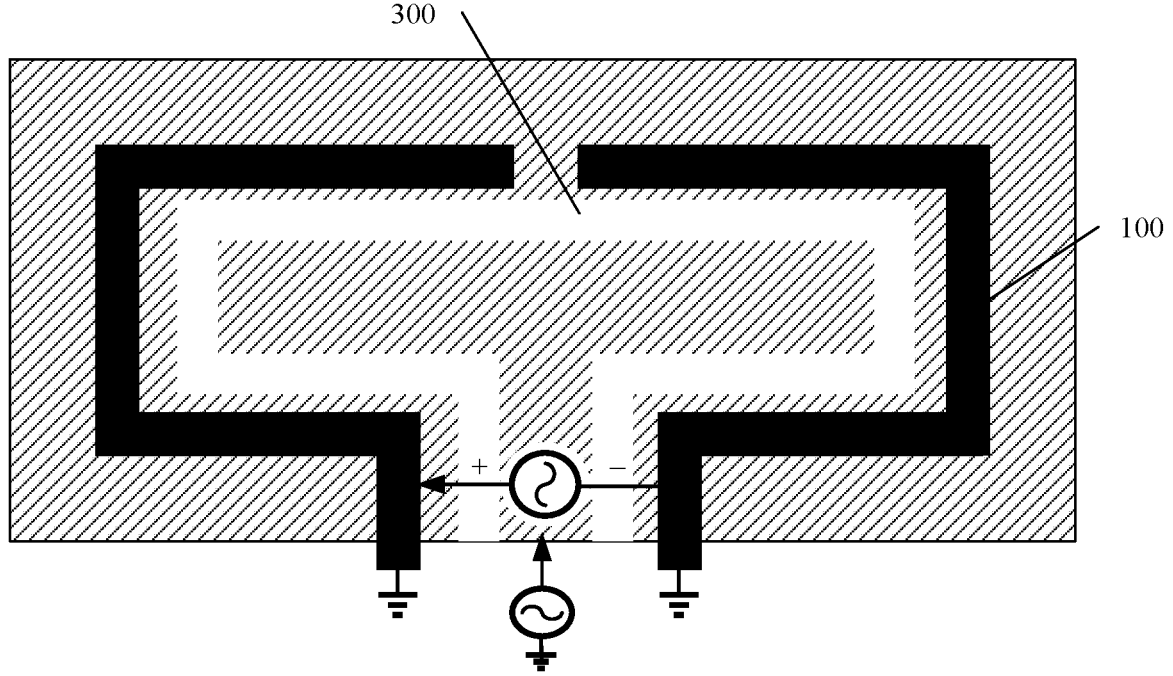
FIG. 29 is a schematic diagram of a dual-antenna structure according to an embodiment of this application.

FIG. 29 is a schematic diagram of a dual-antenna structure according to an embodiment of this application.

As shown in FIG. 29, the electronic device may include at least one wire loop antenna 100 and at least one slot loop antenna 300.

The wire loop antenna 100 may be a wire loop antenna in any form in the foregoing embodiment, and the slot loop antenna 300 may be a slot loop antenna in any form in the foregoing embodiment. For brevity, in this embodiment of this application, the wire loop antenna shown in FIG. 2 and the slot loop antenna shown in FIG. 14 are used as examples for description. Specific types of the wire loop antenna and the slot loop antenna are not limited in this application. The antenna structures in a plurality of forms in this embodiment of this application may constitute a plurality of combined antenna solutions.

It should be understood that, as described in the foregoing embodiment, symmetrical feed and anti-symmetrical feed may be respectively disposed for the wire loop antenna 100 and the slot loop antenna 300. In addition, electric fields generated by resonance excited by symmetrical feed and anti-symmetrical feed is integrally orthogonal in far field. Therefore, isolation between symmetrical feed used by the wire loop antenna 100 and anti-symmetrical feed used by the slot loop antenna 300 is relatively good. Based on the foregoing features, anti-symmetrical feed may be used in a structure of the wire loop antenna 100, and symmetrical feed may be used in a structure of the slot loop antenna 300, to form a split dual-antenna structure. Alternatively, symmetrical feed may be disposed in a structure of the wire loop antenna 100, and anti-symmetrical feed may be disposed in a structure of the slot loop antenna 300, to form a split dual-antenna structure.

Optionally, the slot loop antenna 300 may be disposed on an antenna support, and the wire loop antenna 100 may be disposed on a metal rear cover of the electronic device. Because there is good isolation between the wire loop antenna 100 and the slot loop antenna 300, a distance between the two antenna structures may be relatively short, and the antenna structures are applicable to compact space in an electronic device.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising an antenna structure and a first feed unit, wherein the antenna structure comprises:

a first radiator, wherein the first radiator comprises a first end and a second end; and a second radiator, wherein the second radiator comprises a first end and a second end, wherein:

the first end of the first radiator and the first end of the second radiator face each other and are not in contact with each other, and a slot is formed between the first end of the first radiator and the first end of the second radiator;

the first radiator and the second radiator are disposed in a bent manner, and a spatial region formed between the first radiator, the second radiator, and the slot is T-shaped;

the second end of the first radiator is grounded, and the second end of the second radiator is grounded; and the first feed unit feeds the antenna structure at the first end of the first radiator and the first end of the second radiator, one end of the first feed unit is grounded, and another end of the first feed unit is connected to at least one of the first radiator or the second radiator.

2. The electronic device according to claim 1, wherein the first radiator is located on one side of an axis of the slot, and the second radiator is located on the other side of the axis.

3. The electronic device according to claim 2, wherein the first radiator and the second radiator are symmetrical to each other with respect to the axis.

4. The electronic device according to claim 2, wherein:

when the first feed unit is feeding, a current on the first radiator and a current on the second radiator are symmetrical to each other with respect to the axis.

5. The electronic device according to claim 2, wherein the electronic device further comprises a second feed unit, a positive electrode of the second feed unit is electrically connected to the second end of the first radiator, and a negative electrode of the second feed unit is electrically connected to the second end of the second radiator.

6. The electronic device according to claim 5, wherein when the second feed unit is feeding, a current on the first radiator and a current on the second radiator are anti-symmetrical to each other with respect to the axis.

7. The electronic device according to claim 5, wherein the electronic device further comprises a filter;

one end of the filter is electrically connected to the first end of the first radiator, and the other end is electrically connected to the first end of the second radiator; and when the second feed unit is feeding, the filter exhibits a band-pass characteristic in a first frequency band corresponding to resonance generated when the antenna structure operates in an N-wavelength mode, and the filter has a band-stop characteristic in a second frequency band corresponding to resonance generated when the antenna structure operates in an N–½-wavelength mode, wherein N is a positive integer.

8. The electronic device according to claim 5, wherein the electronic device further comprises a matching network;

the matching network comprises: a first inductor, a second inductor, and a capacitor;

one end of the first inductor is electrically connected to the second end of the first radiator, and the other end of the first inductor is electrically connected to the positive electrode of the second feed unit;

one end of the second inductor is electrically connected to the second end of the second radiator, and the other end of the second inductor is electrically connected to the negative electrode of the second feed unit; and the capacitor is connected in parallel between the first inductor and the second inductor.

9. The electronic device according to claim 8, wherein:

an inductance value of the first inductor is from 0.3 nH to 2 nH;

an inductance value of the second inductor is from 0.3 nH to 2 nH; and a capacitance value of the capacitor is from 0.3 pF to 2 pF.

10. The electronic device according to claim 1, wherein the electronic device further comprises:

a metal part, wherein:

the first feed unit feeds the antenna structure in an indirect coupling manner at the first end of the first radiator and the first end of the second radiator by using the metal part.

11. The electronic device according to claim 10, wherein the metal part comprises a metal spring.

12. The electronic device according to claim 1, wherein the electronic device further comprises a third feed unit configured to feed the antenna structure at the first radiator or the second radiator, and the antenna structure is a single antenna structure.

13. The electronic device according to claim 12, wherein the first radiator and the second radiator are asymmetrical to each other with respect to an axis of the slot, or the third feed unit is configured to asymmetrical feed the antenna structure.

14. The electronic device according to claim 1, wherein the electronic device further comprises:

an antenna support, wherein:

the antenna structure is disposed on a surface of the antenna support.

15. The electronic device according to claim 1, wherein the electronic device further comprises:

an antenna support, wherein:

the first radiator comprises a first part and a second part;

the second radiator comprises a third part and a fourth part;

the first part and the third part are parts of a metal bezel of the electronic device;

the second part and the fourth part are disposed on a surface of the antenna support; and the first part is directly electrically connected to the second part, and the third part is directly electrically connected to the fourth part.

16. The electronic device according to claim 1, wherein the first radiator and the second radiator are folded.

17. An antenna comprises:

a first radiator, wherein the first radiator comprises a first end and a second end; and a second radiator, wherein the second radiator comprises a first end and a second end, wherein:

the first end of the first radiator and the first end of the second radiator face each other and are not in contact with each other, and a slot is formed between the first end of the first radiator and the first end of the second radiator;

the first radiator and the second radiator are disposed in a bent manner, and a spatial region formed between the first radiator, the second radiator, and the slot is T-shaped;

the second end of the first radiator is grounded, and the second end of the second radiator is grounded; and the antenna is fed by a first feed unit at the first end of the first radiator and the first end of the second radiator, wherein one end of the first feed unit is grounded, and another end of the first feed unit is connected to at least one of the first radiator or the second radiator.

18. The antenna according to claim 17, wherein the first radiator is located on one side of an axis of the slot, and the second radiator is located on the other side of the axis.

19. The antenna according to claim 18, wherein the first radiator and the second radiator are symmetrical to each other with respect to the axis.

20. The antenna according to claim 17, wherein the first radiator and the second radiator are folded.

\* \* \* \* \*